US008675528B2

(12) United States Patent
Khoshnevis et al.

(10) Patent No.: US 8,675,528 B2
(45) Date of Patent: Mar. 18, 2014

(54) CONFIGURING UPLINK CONTROL INFORMATION (UCI) REPORTING

(75) Inventors: Ahmad Khoshnevis, Portland, OR (US); Zhanping Yin, Vancouver, WA (US); Shohei Yamada, Camas, WA (US); Sayantan Choudhury, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 667 days.

(21) Appl. No.: 12/946,716

(22) Filed: Nov. 15, 2010

(65) Prior Publication Data

US 2012/0120817 A1    May 17, 2012

(51) Int. Cl.
*H04B 7/00*    (2006.01)
(52) U.S. Cl.
USPC .......................................... 370/310; 370/522
(58) Field of Classification Search
None
See application file for complete search history.

(56) References Cited

U.S. PATENT DOCUMENTS

| 2010/0098012 | A1* | 4/2010 | Bala et al. ................... 370/329 |
| 2010/0135173 | A1* | 6/2010 | Tynderfeldt et al. ......... 370/252 |
| 2010/0195575 | A1 | 8/2010 | Papasakellariou et al. | |
| 2010/0271970 | A1 | 10/2010 | Pan et al. | |
| 2011/0141928 | A1* | 6/2011 | Shin et al. ................... 370/252 |
| 2012/0002568 | A1* | 1/2012 | Tiirola et al. ................ 370/252 |

FOREIGN PATENT DOCUMENTS

| WO | 2009/015092 | 1/2009 |
| WO | 2010/048142 | 4/2010 |

OTHER PUBLICATIONS

Ericsson, ST-Ericsson, "Periodic CSI Reporting for CA," 3GPP TSG RAN WG1 Meeting #62bis, R1-105314, Oct. 2010.
International Preliminary Report on Patentability issued for International Patent Application No. PCT/JP2011/076596 on Feb. 26, 2013.
"UL CC selection for UCI transmission on PUSCH", 3GPP TSG RAN WG1 Meeting #62bis, R1-105652, Oct. 11-15, 2010, Xian, China.
"UCI transmission for Simultaneous PUCCH/PUSCH", 3GPP TSG RAN WG1 Meeting #63, R1-106104. Nov. 15-19, 2010, Jacksonville, USA.
"UCI multiplexing on PUSCH for carrier aggregation", 3GPP TSG RAN WG1 Meeting #62,R1-104502, Aug. 23-27, 2010, Madrid, Spain.
"DL CC selection for aperiodic CSI request", 3GPP TSG RAN WG1 Meeting #62, R1-104646,Aug. 23-27th, 2010, Madrid Spain.
Written Opinion issued for International Patent Application No. PCT/JP2011/076596 on Aug. 14, 2012.
3GPP TS 36.300 V9.0.0, "Evolved Universal Terrestrial Radio Access (E-UTRA) and Evolved Universal Terrestrial Radio Access Network (E-UTRAN); Overall Description; Stage 2 (Release 9)," Jun. 2009.
3GPP TS 36.331 V9.1.0, "Evolved Universal Terrestrial Radio Access (E-UTRA) Radio Resource Control (RRC); Protocol specification (Release 9)," Dec. 2009.

(Continued)

*Primary Examiner* — Kevin C Harper
(74) *Attorney, Agent, or Firm* — Austin Rapp & Hardman

(57) ABSTRACT

A method for reporting uplink control information (UCI) by a user equipment (UE) is described. Downlink channels are measured to obtain channel state information (CSI). Radio resource control (RRC) signaling is received from an eNode B. It is determined whether simultaneous physical uplink control channel (PUCCH) and physical uplink shared channel (PUSCH) transmission is enabled. One or more CSI reports are transmitted on the PUSCH according to the RRC signaling.

44 Claims, 14 Drawing Sheets

(56) References Cited

OTHER PUBLICATIONS

3GPP TS 36.213 V8.6.0, "Evolved Universal Terrestrial Radio Access (E-UTRA) Physical layer procedures (Release 8)," Mar. 2009.

3GPP TS 36.212 V9.0.0, "Evolved Universal Terrestrial Radio Access (E-UTRA); Multiplexing and Channel Coding (Release 9)," Dec. 2009.

3GPP TS 36.211 V9.0.0, "Evolved Universal Terrestrial Radio Access (E-UTRA); Physical Channels and Modulation (Release 9)," Dec. 2009.

Qualcomm Incorporated, "UCI Transmission for CA," 3GPP TSG RAN WG1 #62bis, R1-105563, Oct. 2010.

InterDigital Communications, LLC, "PUSCH Selection for Transmission of UCI," 3GPP TSG-RAN WG1 Meeting #62bis, R1-105277, Oct. 2010.

MediaTek Inc., "Remaining Issues of PUSCH Selection for UCI in Carrier Aggregation," 3GPP TSG-RAN WG1 #62bis, R1-105235, Oct. 2010.

HTC, "UCI on Simultaneous PUCCH/PUSCH Transmission," 3GPP TSG-RAN WG1 #62bis, R1-105516, Oct. 2010.

LG Electronics, "UCI Transmission for Simultaneous PUCCH/PUSCH," 3GPP TSG RAN WG1 Meeting #63, R1-106104, Nov. 2010.

International Search Report issued for International Patent Application No. PCT/JP2011/076596 on Feb. 7, 2012.

* cited by examiner

CONFIGURING UPLINK CONTROL INFORMATION (UCI) REPORTING

TECHNICAL FIELD

The present invention relates generally to wireless communications and wireless communications-related technology. More specifically, the present invention relates to systems and methods for configuring uplink control information (UCI) reporting.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of cells, each of which may be serviced by a base station. A base station may be a fixed station that communicates with mobile stations.

Various signal processing techniques may be used in wireless communication systems to improve efficiency and quality of wireless communication. One such technique may include using simultaneous physical uplink control channel (PUCCH) and physical uplink shared channel (PUSCH) transmissions. Benefits may be realized by using different uplink control information (UCI) reporting for simultaneous physical uplink control channel (PUCCH) and physical uplink shared channel (PUSCH) transmissions and non-simultaneous physical uplink control channel (PUCCH) and physical uplink shared channel (PUSCH) transmissions.

DETAILED DESCRIPTION

Figure 1:
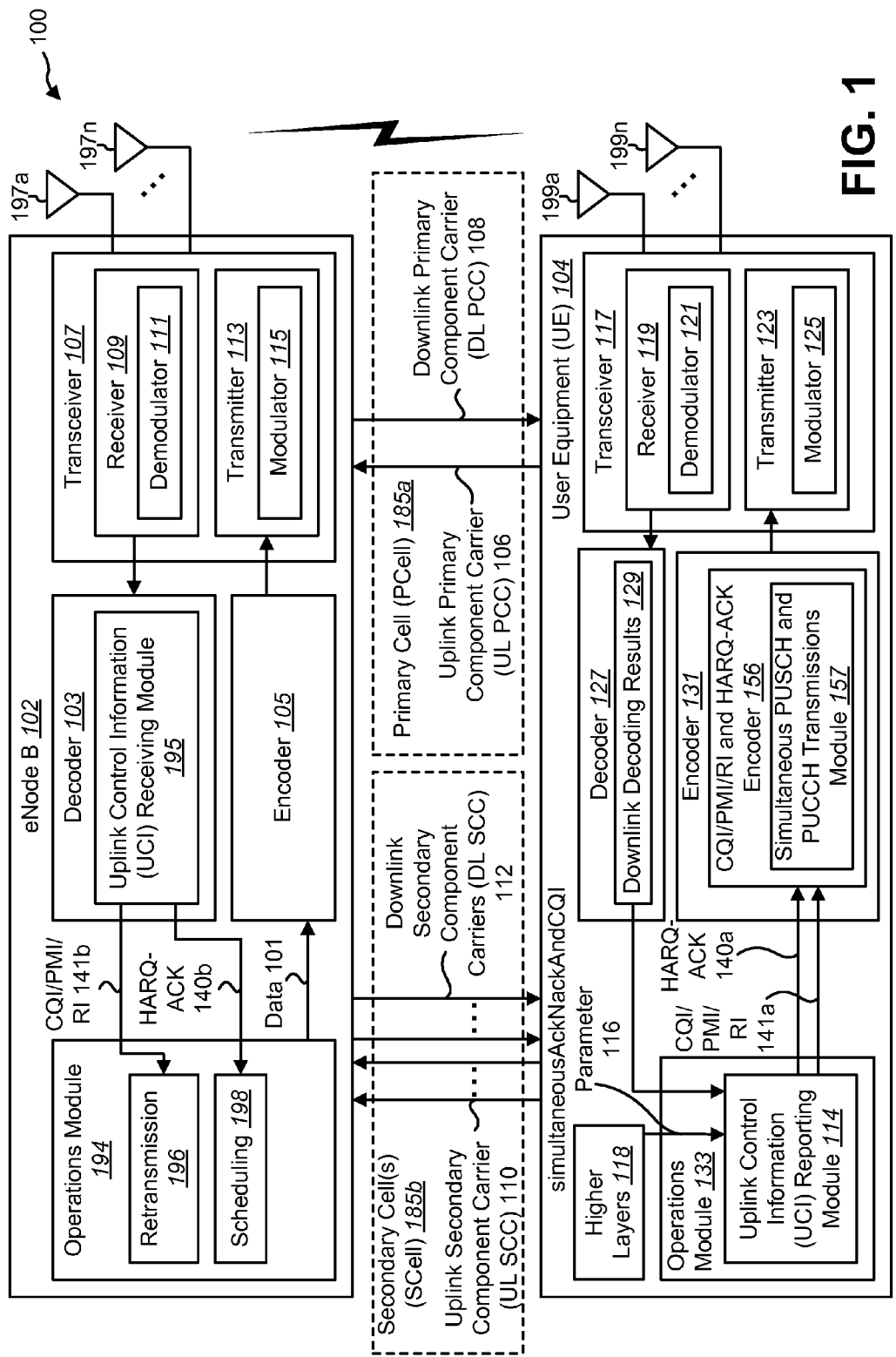
FIG. 1 is a block diagram illustrating a wireless communication system using uplink control information (UCI) multiplexing.

A method for reporting uplink control information (UCI) by a user equipment (UE) is described. Downlink channels are measured to obtain periodic channel state information (CSI) reports. Radio resource control (RRC) signaling is received from an eNode B. It is determined whether simultaneous physical uplink control channel (PUCCH) and physical uplink shared channel (PUSCH) transmission is enabled. One or more CSI reports are transmitted on the PUSCH according to the RRC signaling.

Simultaneous PUCCH and PUSCH transmission may be enabled. The UCI may be transmitted on the PUCCH. Transmitting the UCI on the PUCCH may include determining that the UCI does not include an HARQ-ACK and determining whether the UCI includes one or more periodic CSI reports. Transmitting the UCI on the PUCCH may also include determining that UCI does include an HARQ-ACK and determining whether the UCI includes one or more periodic CSI reports.

The UCI may include or more periodic CSI reports. Transmitting the UCI on the PUCCH may also include determining whether a simultaneousAckNackAndCQI parameter is set to true or false. The simultaneousAckNackAndCQI parameter may be received via the RRC signaling from the eNode B. If the simultaneousAckNackAndCQI parameter is set to false, transmitting the UCI on the PUCCH may also include dropping the periodic CSI reports and transmitting the HARQ-ACK using Format 1a/1b/3. If the simultaneousAckNackAndCQI parameter is set to true, transmitting the UCI on the PUCCH may include transmitting the HARQ-ACK and one periodic CSI report on the PUCCH.

Transmitting one or more CSI reports on the PUSCH may include transmitting one or more aperiodic CSI reports on the PUSCH, determining that there are remaining periodic CSI reports for transmission and determining whether a Multiple-CSI-Report parameter is set to on or off. The Multiple-CSI-Report parameter may be received via the RRC signaling from the eNode B. If the Multiple-CSI-Report parameter is set to off, transmitting one or more CSI reports on the PUSCH may include determining that no periodic CSI report is transmitted on the PUCCH and transmitting one periodic CSI report on the PUSCH. If the Multiple-CSI-Report parameter is set to on, transmitting one or more CSI reports on the PUSCH may include determining that a Multiple-CSI-Report-PUSCH parameter is set to off. The Multiple-CSI-Report-PUSCH parameter may be received via the RRC signaling from the eNode B. If the Multiple-CSI-Report parameter is set to on, transmitting one or more CSI reports on the PUSCH may also include transmitting one periodic CSI report on the PUSCH.

If the Multiple-CSI-Report parameter is set to on, transmitting one or more CSI reports on the PUSCH may include determining that a Multiple-CSI-Report-PUSCH parameter is set to on and transmitting one or more periodic CSI reports on the PUSCH. The Multiple-CSI-Report-PUSCH parameter may be received via the RRC signaling from the eNode B.

A number of periodic CSI reports transmitted on the PUSCH may depend on a CSI-Report-List parameter received via the RRC signaling from the eNode B or a Number-of-CSI-Report parameter received via the RRC signaling from the eNode B. No periodic CSI reports may be transmitted on the PUSCH when a No-CSI-on-PUSCH parameter is set to true. The No-CSI-on-PUSCH parameter may be received via the RRC signaling from the eNode B.

All periodic CSI reports may be transmitted on the PUSCH and no periodic CSI reports may be transmitted on the PUCCH when a No-CSI-PUSCH parameter is set to false. The No-CSI-on-PUSCH parameter may be received via the RRC signaling from the eNode B. The remaining periodic CSI reports may be transmitted on the PUSCH when a No-CSI-PUSCH parameter is set to false. The remaining periodic CSI reports may be those periodic CSI reports that remain after the UCI is transmitted on the PUCCH.

A number of periodic CSI reports transmitted on the PUSCH and a number of aperiodic CSI reports transmitted on the PUSCH may depend on a Number-of-CSI-Report parameter received via the RRC signaling from the eNode B or a CSI-Report-List parameter received via the RRC signaling from the eNode B. If the Multiple-CSI-Report parameter is set to on, transmitting one or more CSI reports on the PUSCH may include transmitting one or more periodic CSI reports on the PUSCH.

Transmitting one or more CSI reports on the PUSCH may include transmitting one or more aperiodic CSI reports on the PUSCH. Transmitting one or more CSI reports on the PUSCH may also include determining that there are remaining periodic CSI reports for transmission. Transmitting one or more CSI reports on the PUSCH may further include determining whether a Multiple-CSI-Report-PUSCH parameter is set to on or off. The Multiple-CSI-Report-PUSCH parameter may be received via the RRC signaling from the eNode B.

If the Multiple-CSI-Report-PUSCH parameter is set to off, transmitting one or more CSI reports on the PUSCH may include transmitting one periodic CSI report on the PUSCH. If the Multiple-CSI-Report-PUSCH parameter is set to on, transmitting one or more CSI reports on the PUSCH may include transmitting one or more periodic CSI reports on the PUSCH.

If simultaneous PUCCH and PUSCH transmission is not enabled, transmitting one or more CSI reports on the PUSCH may include transmitting one or more aperiodic CSI reports on the PUSCH. Transmitting one or more CSI reports on the PUSCH may also include determining that the UCI comprises one or more periodic CSI reports. Transmitting one or more CSI reports on the PUSCH may further include determining whether a Multiple-CSI-Report parameter is set to on or off. The Multiple-CSI-Report parameter may be received via the RRC signaling from the eNode B.

If the Multiple-CSI-Report parameter is set to off, transmitting one or more CSI reports on the PUSCH may include determining that a Multiple-CSI-Report-PUSCH parameter is set to off and transmitting one periodic CSI report on the PUSCH.

If the Multiple-CSI-Report parameter is set to on, transmitting one or more CSI reports on the PUSCH may include determining that a Multiple-CSI-Report-PUSCH parameter is set to off and transmitting one periodic CSI report on the PUSCH.

If the Multiple-CSI-Report parameter is set to on, transmitting one or more CSI reports on the PUSCH may also include determining that a Multiple-CSI-Report-PUSCH parameter is set to on and transmitting one or more periodic CSI reports on the PUSCH. If the Multiple-CSI-Report parameter is set to on, transmitting one or more CSI reports on the PUSCH may include transmitting one or more periodic CSI reports on the PUSCH. If the Multiple-CSI-Report parameter is set to off, transmitting one or more CSI reports on the PUSCH may include transmitting only one periodic CSI report on the PUSCH.

Transmitting one or more CSI reports on the PUSCH may include determining that the UCI comprises one or more periodic CSI reports and determining whether a Multiple-CSI-Report-PUSCH parameter is set to on or off. If the Multiple-CSI-Report-PUSCH parameter is set to on, transmitting one or more CSI reports on the PUSCH may include transmitting one or more periodic CSI reports on the PUSCH. If the Multiple-CSI-Report-PUSCH parameter is set to off, transmitting one or more CSI reports on the PUSCH may include transmitting only one periodic CSI report on the PUSCH.

A user equipment (UE) configured for reporting uplink control information (UCI) is also described. The UE includes a processor, memory in electronic communication with the processor and instructions stored in the memory. The instructions are executable to measure downlink channels to obtain channel state information (CSI). The instructions are also executable to receive radio resource control (RRC) signaling from an eNode B. The instructions are further executable to determine whether simultaneous physical uplink control channel (PUCCH) and physical uplink shared channel (PUSCH) transmission is enabled. The instructions are also executable to transmit one or more CSI reports on the PUSCH according to the RRC signaling.

The 3rd Generation Partnership Project, also referred to as "3GPP," is a collaboration agreement that aims to define globally applicable technical specifications and technical reports for third and fourth generation wireless communication systems. The 3GPP may define specifications for the next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE and LTE-Advanced standards (e.g., Release-8, Release-9 and Release-10). However, the scope of the present disclosure should not be limited in this regard. At least some aspects of the systems and methods disclosed herein may be utilized in other types of wireless communication systems.

The term "simultaneous" may be used herein to denote a situation where two or more events occur in overlapping time frames. In other words, two "simultaneous" events may overlap in time to some extent, but are not necessarily of the same duration. Furthermore, simultaneous events may or may not begin or end at the same time.

FIG. 1 is a block diagram illustrating a wireless communication system 100 using uplink control information (UCI) multiplexing. An eNode B 102 may be in wireless communication with one or more user equipments (UEs) 104. An eNode B 102 may be referred to as an access point, a Node B, a base station or some other terminology. Likewise, a user equipment (UE) 104 may be referred to as a mobile station, a subscriber station, an access terminal, a remote station, a user terminal, a terminal, a handset, a subscriber unit, a wireless communication device, or some other terminology.

Communication between a user equipment (UE) 104 and an eNode B 102 may be accomplished using transmissions over a wireless link, including an uplink and a downlink. The uplink refers to communications sent from a user equipment (UE) 104 to an eNode B 102. The downlink refers to communications sent from an eNode B 102 to a user equipment (UE) 104. The communication link may be established using a single-input and single-output (SISO), multiple-input and single-output (MISO), single-input and multiple-output (SIMO) or a multiple-input and multiple-output (MIMO) system. A MIMO system may include both a transmitter and a receiver equipped with multiple transmit and receive antennas. Thus, an eNode B 102 may have multiple antennas and a user equipment (UE) 104 may have multiple antennas. In this way, the eNode B 102 and the user equipment (UE) 104 may each operate as either a transmitter or a receiver in a MIMO system. One benefit of a MIMO system is improved performance if the additional dimensionalities created by the multiple transmit and receive antennas are utilized.

The user equipment (UE) 104 communicates with an eNode B 102 using one or more antennas 199a-n. The user equipment (UE) 104 may include a transceiver 117, a decoder 127, an encoder 131 and an operations module 133. The transceiver 117 may include a receiver 119 and a transmitter 123. The receiver 119 may receive signals from the eNode B 102 using one or more antennas 199a-n. For example, the receiver 119 may receive and demodulate received signals using a demodulator 121. The transmitter 123 may transmit signals to the eNode B 102 using one or more antennas 199a-n. For example, the transmitter 123 may modulate signals using a modulator 125 and transmit the modulated signals.

The receiver 119 may provide a demodulated signal to the decoder 127. The user equipment (UE) 104 may use the decoder 127 to decode signals and make downlink decoding results 129. The downlink decoding results 129 may indicate whether data was received correctly. For example, the downlink decoding results 129 may indicate whether a packet was correctly or erroneously received (i.e., positive acknowledgement, negative acknowledgement or discontinuous transmission (no signal)).

The operations module 133 may be a software and/or hardware module used to control user equipment (UE) 104 communications. For example, the operations module 133 may determine when the user equipment (UE) 104 requires resources to communicate with an eNode B 102.

In 3$^{rd}$ Generation Partnership Project (3GPP) Long Term Evolution (LTE)—Advanced, additional control feedback will have to be sent on control channels to accommodate MIMO and carrier aggregation (CA). Carrier aggregation refers to transmitting data on multiple component carriers (CC) that are contiguously or separately located. Both the hybrid automatic repeat and request (ARQ) acknowledgement (HARQ-ACK) with positive-acknowledge and negative-acknowledge (ACK/NACK) bits and other control information may be transmitted using the physical uplink control channel (PUCCH). In carrier aggregation (CA), only one uplink component carrier may be utilized for transmission of control information. In LTE-A, component carriers are referred to as cells.

The user equipment (UE) 104 may transmit uplink control information (UCI) to an eNode B 102 on the uplink. The uplink control information (UCI) may include a channel quality indicator (CQI), a precoding matrix index (PMI), rank indication (RI), a scheduling request (SR) and a hybrid automatic repeat request acknowledgement (HARQ-ACK) 140a. HARQ-ACK 140a means ACK (positive-acknowledgement) and/or NACK (negative-acknowledgement) and/or DTX (discontinuous transmission) responses for HARQ operation, also known as ACK/NACK. If a transmission is successful, the HARQ-ACK 140a may have a logical value of 1 and if the transmission is unsuccessful, the HARQ-ACK 140a may have a logical value of 0.

In one configuration, the CQI/PMI/RI 141a and the HARQ-ACK 140a may be separately coded. In another configuration, the CQI/PMI/RI 141a and the HARQ-ACK 140a may be jointly coded. Herein, CQI/PMI/RI 141 refers to CQI and/or PMI and/or RI. CQI/PMI/RI 141 may also be referred to as channel state information (CSI). The CQI and/or PMI and/or RI may be reported together or independently based on the physical uplink control channel (PUCCH) reporting modes. ACK/NACK refers to ACK and/or NACK. CQI/PMI/RI 141 and HARQ-ACK 140 refers to ((CQI and/or PMI and/or RI) AND HARQ-ACK 140). CQI/PMI/RI 141 or HARQ-ACK refers to ((CQI and/or PMI and/or RI) OR HARQ-ACK 140). The CQI/PMI/RI 141 may be collectively referred to as channel state information (CSI). A channel state information (CSI) report thus may include a CQI/PMI/RI 141 report. Channel state information (CSI) is discussed in additional detail below in relation to FIG. 2.

Channel state information (CSI) may be periodic or aperiodic. Aperiodic channel state information (CSI) may be requested by an eNode B 102. Aperiodic channel state information (CSI) is not transmitted on the physical uplink control channel (PUCCH). Periodic channel state information (CSI) may be configured by an eNode B 102, so that a user equipment (UE) 104 reports channel state information (CSI) to the eNode B 102 at pre-specified subframes. When periodic channel state information (CSI) is scheduled for transmission, if the physical uplink control channel (PUCCH) is available, the periodic channel state information (CSI) may be transmitted on the physical uplink control channel (PUCCH). Hence, there is a need for a distinction between periodic channel state information (CSI) and aperiodic channel state information (CSI).

The CQI/PMI/RI 141a report and the HARQ-ACK 140a may be generated by the uplink control information (UCI) reporting module 114 and transferred to a CQI/PMI/RI and HARQ-ACK encoder 156 that is part of the encoder 131. The CQI/PMI/RI and HARQ-ACK encoder 156 may generate uplink control information (UCI) using backwards compatible physical uplink control channel (PUCCH) formats and physical uplink shared channel (PUSCH) formats. Backwards compatible physical uplink control channel (PUCCH) formats are those formats that may be used by Release-10 user equipments (UEs) 104 as well as Release-8/9 user equipments (UEs) 104.

The CQI/PMI/RI and HARQ-ACK encoder 156 may include a simultaneous physical uplink control channel (PUCCH) and physical uplink shared channel (PUSCH) transmissions module 157. In Release-8, a user equipment (UE) 104 does not simultaneously transmit on the physical uplink control channel (PUCCH) and the physical uplink shared channel (PUSCH). If the physical uplink shared channel (PUSCH) is available, no aperiodic channel state information (CSI) reports are transmitted on the physical uplink control channel (PUCCH).

One resource of the physical uplink control channel (PUCCH) may be allocated for transmission of the uplink control information (UCI) with collision resolution procedures resolving any collision issues. In general, the resource allocated for the transmission of HARQ-ACK 140a is different from the resource allocated for the transmission of periodic channel state information (CSI) on the physical uplink control channel (PUCCH). If only one of the HARQ-ACK 140a and the periodic channel state information (CSI) is available for transmission, the corresponding resource is used for transmissions. In case of a collision in the schedule of the transmission of HARQ-ACK 140a and channel state information (CSI), a collision resolution procedure may be used to determine the resource and format used for transmission. If the physical uplink shared channel (PUSCH) is available, the aperiodic channel state information (CSI) reports may take priority over periodic channel state information (CSI) reports and be time and/or frequency shared with the HARQ-ACK 140.

In 3GPP LTE Release-10 (LTE-A or Advanced EUTRAN), simultaneous physical uplink shared channel (PUSCH) and physical uplink control channel (PUCCH) transmission is introduced. Herein, the physical uplink shared channel (PUSCH) is assumed to always be scheduled. A user equipment (UE) 104 that has multiple uplink control information (UCI) elements for transmission may experience a collision. Some collision resolution procedures have already been defined. For example, when an HARQ-ACK 140 and a channel state information (CSI) report collide, a simultaneousAckNackAndCQI parameter 116 may resolve the collision. The simultaneousAckNackAndCQI parameter 116 is discussed in additional detail below.

The use of simultaneous physical uplink shared channel (PUSCH) and physical uplink control channel (PUCCH) transmissions may be configured by a radio resource control (RRC) configuration based on user equipment (UE) 104 specific RRC signaling. When a user equipment (UE) 104 that is configured for simultaneous physical uplink shared channel (PUSCH) and physical uplink control channel (PUCCH) transmission is allocated or assigned both the physical uplink shared channel (PUSCH) and the physical uplink control channel (PUCCH) on a subframe or when the user equipment (UE) 104 is required to transmit on both the physical uplink shared channel (PUSCH) and the physical uplink control channel (PUCCH) on a subframe, the user equipment (UE) 104 may transmit on the physical uplink shared channel (PUSCH) and the physical uplink control channel (PUCCH) simultaneously.

However, an eNode B 102 may want to enforce a Release-10 user equipment (UE) 104 to not simultaneously transmit on the physical uplink shared channel (PUSCH) and the physical uplink control channel (PUCCH) during some situations. For example, when a user equipment (UE) 104 is in a transition state during RRC configuration, when the power of the user equipment (UE) 104 is not enough to transmit both the physical uplink control channel (PUCCH) and the physical uplink shared channel (PUSCH) or when a scheduler on the eNode B 102 does not want to allocate the physical uplink control channel (PUCCH) resource to the user equipment (UE) 104 for a subframe, it may be desirable that the user equipment (UE) 104 does not simultaneously transmit on both the physical uplink shared channel (PUSCH) and the physical uplink control channel (PUCCH). The user equipment (UE) 104 may use the simultaneous physical uplink shared channel (PUSCH) and physical uplink control channel (PUCCH) transmissions module 157 to dynamically switch between simultaneous physical uplink shared channel (PUSCH) and physical uplink control channel (PUCCH) transmission and non-simultaneous physical uplink shared channel (PUSCH) and physical uplink control channel (PUCCH) transmission.

Thus, one benefit of using a procedure/mechanism where simultaneous physical uplink shared channel (PUSCH) and physical uplink control channel (PUCCH) transmission may be used in a normal case and non-simultaneous physical uplink shared channel (PUSCH) and physical uplink control channel (PUCCH) transmissions may be used in a special case is that it is possible to dynamically switch between simultaneous physical uplink shared channel (PUSCH) and physical uplink control channel (PUCCH) transmission and non-simultaneous physical uplink shared channel (PUSCH) and physical uplink control channel (PUCCH) transmissions even if it is under the configuration which allows simultaneous physical uplink shared channel (PUSCH) and physical uplink control channel (PUCCH) transmission. This allows the eNode B 102 greater flexibility in assigning time/frequency resources to user equipments (UEs) 104.

In LTE Release-8/9, physical uplink control channel (PUCCH) Format 1/1a/1b may be used to report the HARQ-ACK 140a and physical uplink control channel (PUCCH) Format 2 may be used to report periodic CQI/PMI/RI 141a. When a collision between periodic CQI/PMI/RI 141a and HARQ-ACK 140a reporting on the physical uplink control channel (PUCCH) occurs, Format 2 with joint coding for extended cyclic prefix (CP) or Format 2a/2b for normal cyclic prefix (CP) can be used to report the CQI/PMI/RI 141a and the HARQ-ACK 140a simultaneously. Simultaneous transmission may be feasible when the radio resource control (RRC) parameter simultaneousAckNackAndCQI 116 is true, otherwise the CQI/PMI/RI may be dropped and only the HARQ-ACK 140a is transmitted.

To report the HARQ-ACK 140 on the physical uplink control channel (PUCCH), for Release-10 user equipments (UEs) 104 that support up to four HARQ-ACK 140 bits, the physical uplink control channel (PUCCH) Format 1a/1b with channel selection may be used. Since the new Format 3 is not supported by these user equipments (UEs) 104, a backward compatible physical uplink control channel (PUCCH) format may be reused.

For Release-10 user equipments (UEs) 104 that support more than four HARQ-ACK 140 bits, physical uplink control channel (PUCCH) Format 1a/1b can also be used for up to four bits of HARQ-ACK 140 reporting. Thus, the backward compatible physical uplink control channel (PUCCH) format may also be used.

A new DFT-S-OFDM based Format 3 can be used for Release-10 user equipments (UEs) 104 that support more than four HARQ-ACK 140 bits, regardless of the actual HARQ-ACK 140 payload sizes. Because of cubic metric issues, only one physical uplink control channel (PUCCH) signal may be transmitted at any given time interval (or transmission time interval (TTI)). The cubic metric issues refer to a limitation on the peak-to-average power ratio (PAPR) (however, cubic metric is not a direct measurement of PAPR). With simultaneous CQI/PMI/RI 141 and HARQ-ACK 140 reporting, a backward compatible physical uplink control channel (PUCCH) Format 2/2a/2b based method or a method for simultaneous reporting using the new Format 3 may be used.

The user equipment (UE) 104 may also transmit a reference signal (RS) to an eNode B 102. The uplink control information (UCI) may be transmitted using the physical uplink control channel (PUCCH) and/or the physical uplink shared channel (PUSCH). One or more physical uplink control channel (PUCCH) reference signal (RS) symbols are included in a physical uplink control channel (PUCCH) signal transmission on each slot.

The time and frequency resources may be quantized to create a grid known as the Time-Frequency grid. In the time domain, 10 milliseconds (ms) is referred to as one radio frame. One radio frame may include 10 subframes, each with a duration of 1 ms which is the duration of transmission in the uplink and/or downlink. Every subframe may be divided into two slots, each with a duration of 0.5 ms. Each slot may be divided into 7 symbols.

The frequency domain may be divided into bands with a 15 kilohertz (kHz) width referred to as a subcarrier. One resource element has a duration of one symbol in the time domain and the bandwidth of one subcarrier in the frequency domain.

The minimum amount of resource that can be allocated for the transmission of information in the uplink or downlink in any given subframe is two resource blocks (RBs), one RB at each slot. One RB has a duration of 0.5 ms (7 symbols or one slot) in the time domain and a bandwidth of 12 subcarriers (180 kHz) in the frequency domain. At any given subframe, a maximum of two RBs (one RB at each slot) can be used by a given user equipment (UE) 104 for the transmission of uplink control information (UCI) in the physical uplink control channel (PUCCH). However, the eNode B 102 may allocate different RBs for the transmission of HARQ-ACK 140a and periodic channel state information (CSI). In case of a collision, a collision resolution mechanism may decide which RB and what format are used for the transmission of both or one of the HARQ-ACK 140a and the periodic channel state information (CSI).

In LTE Release-8, only one uplink component carrier (CC) and one downlink component carrier (CC) can be used for transmission to and reception from each user equipment (UE) 104. The uplink control information (UCI) such as ACK/NACK bits for hybrid ARQ (HARQ) 140a and periodic channel quality indicators (CQI), periodic precoding matrix index (PMI) and periodic rank indication (RI) can be sent on the physical uplink control channel (PUCCH), on the physical uplink shared channel (PUSCH) or on both. In one configuration, there may be a first uplink control information (UCI) that is scheduled on the physical uplink control channel (PUCCH) and a second uplink control information (UCI) that is scheduled on the physical uplink shared channel (PUSCH). In some conditions, for example in cases where a collision between the physical uplink control channel (PUCCH) and the physical uplink shared channel (PUSCH) occurs, the uplink control information (UCI) that is scheduled on the physical uplink control channel (PUCCH) may be transmitted on the physical uplink shared channel (PUSCH).

The physical uplink control channel (PUCCH) may occupy one resource block (RB) at each slot. Thus, a very limited amount of information can be transmitted on the physical uplink control channel (PUCCH). With physical uplink control channel (PUCCH) Format 1/1a/1b, only one or two ACK/NACK bits are transmitted. With physical uplink control channel (PUCCH) Format 2/2a/2b, one or two ACK/NACK bits can be simultaneously transmitted with four to eleven bits of CQI/PMI/RI 141. Thus, the maximum payload size that can be carried on a Release-8 physical uplink control channel (PUCCH) is thirteen bits.

Format 1a may be used for a one bit HARQ-ACK 140. Format 1a may also be used for a one bit HARQ-ACK 140 with positive scheduling request (SR) in frequency division duplexing (FDD). Format 1b may be used for a two bit HARQ-ACK 140 or for a two bit HARQ-ACK 140 with a positive scheduling request (SR). Format 1b may also be used for an HARQ-ACK 140 with channel selection. Format 1 may be used for a positive scheduling request (SR).

Format 2 may be used for a periodic CQI/PMI/RI report when the periodic CQI/PMI/RI report is not multiplexed with the HARQ-ACK 140. Format 2 may also be used for a periodic CQI/PMI/RI report when the periodic CQI/PMI/RI report is multiplexed with the HARQ-ACK 140 for extended cyclic prefix. Format 2a may be used for a periodic CQI/PMI/RI report that is multiplexed with a one bit HARQ-ACK 140 for normal cyclic prefix. Format 2b may be used for a periodic CQI/PMI/RI report that is multiplexed with a two bit HARQ-ACK 140 for normal cyclic prefix.

In 3GPP Long Term Evolution (LTE) Release-10 (LTE-A or Advanced EUTRAN), carrier aggregation was introduced. Carrier aggregation may also be referred to as cell aggregation. Carrier aggregation is supported in both the uplink and the downlink with up to five component carriers, also known as cells. Each component carrier or cell may have a transmission bandwidth of up to one hundred and ten resource blocks. In carrier aggregation, two or more component carriers or cells are aggregated to support wider transmission bandwidths up to 100 megahertz (MHz). A user equipment (UE) 104 may simultaneously receive and/or transmit on one or multiple component carriers or cells, depending on the capabilities of the user equipment (UE) 104.

Based on current agreements, cyclic reporting of periodic CQI/PMI/RI 141 of each component carrier is supported in Release-10. Thus, the same periodic CQI/PMI/RI payload as in Release-8 can be used. Therefore, a Format 2 based physical uplink control channel (PUCCH) may be reused for periodic CQI/PMI/RI 141 reporting of each component carrier or cell.

For LTE Release-10 and beyond, in case of a collision between a periodic CQI/PMI/RI 141 and an HARQ-ACK 140 in the same subframe on the physical uplink control channel (PUCCH), the periodic CQI/PMI/RI 141 may be dropped as in Release-8/9. Because LTE Release-10 and beyond has multiple component carriers or cells using cyclic CQI/PMI/RI 141 reporting, the interval between the next reporting of the same component carrier or cell may be longer than that of Release-8/9. Dropping a periodic CQI/PMI/RI 141 may cause poor channel estimation. Therefore, a method for the simultaneous reporting of periodic CQI/PMI/RI 141 and HARQ-ACK 140 should be supported in Release-10.

The uplink control information (UCI) generated by the uplink control information (UCI) reporting module 114 may be dependent on the simultaneousAckNackAndCQI parameter 116. For example, the format used for transmitting the uplink control information (UCI) may be dependent on the simultaneousAckNackAndCQI parameter 116. The simultaneousAckNackAndCQI parameter 116 may be provided by higher layers 118 (e.g., the radio resource control (RRC) layer) on the user equipment (UE) 104. The simultaneousAckNackAndCQI parameter 116 may be used by the user equipment (UE) 104 to determine whether to use periodic CQI/PMI/RI 141 dropping or simultaneous reporting of the periodic CQI/PMI/RI 141 and the HARQ-ACK 140. The choice of periodic CQI/PMI/RI 141 dropping or simultaneous reporting of the periodic CQI/PMI/RI 141 and the HARQ-ACK 140 may be configured by the eNode B 102. For example, simultaneous periodic CQI/PMI/RI 141 and HARQ-ACK 140 reporting should be used if the simultaneousAckNackAndCQI parameter 116 is set to TRUE. Otherwise, the periodic CQI/PMI/RI 141 should be dropped.

A user equipment (UE) 104 may communicate with an eNode B 102 using multiple cells 185 at the same time. For example, a user equipment (UE) 104 may communicate with an eNode B 102 using a primary cell (PCell) 185a while simultaneously communicating with the eNode B 102 using secondary cell(s) (SCell) 185b. Similarly, an eNode B 102 may communicate with a user equipment (UE) 104 using multiple cells 185 at the same time. For example, an eNode B 102 may communicate with a user equipment (UE) 104 using a primary cell (PCell) 185a while simultaneously communicating with the user equipment (UE) 104 using secondary cell(s) (SCell) 185b.

An eNode B 102 may include a transceiver 107 that includes a receiver 109 and a transmitter 113. An eNode B 102 may additionally include a decoder 103, an encoder 105 and an operations module 194. An eNode B 102 may receive uplink control information (UCI) using its one or more antennas 197a-n and its receiver 109. The receiver 109 may use the demodulator 111 to demodulate the uplink control information (UCI).

The decoder 103 may include an uplink control information (UCI) receiving module 195. An eNode B 102 may use the uplink control information (UCI) receiving module 195 to decode and interpret the uplink control information (UCI) received by the eNode B 102. The eNode B 102 may use the decoded uplink control information (UCI) to perform certain operations, such as retransmit one or more packets based or schedule communication resources for the user equipment (UE) 104. The uplink control information (UCI) may include a CQI/PMI/RI 141b and/or an HARQ-ACK 140b.

The operations module 194 may include a retransmission module 196 and a scheduling module 198. The retransmission module 196 may determine which packets to retransmit (if any) based on the uplink control information (UCI). The scheduling module 198 may be used by the eNode B 102 to schedule communication resources (e.g., bandwidth, time slots, frequency channels, spatial channels, etc.). The scheduling module 198 may use the uplink control information (UCI) to determine whether (and when) to schedule communication resources for the user equipment (UE) 104.

The operations module 194 may provide data 101 to the encoder 105. For example, the data 101 may include packets for retransmission and/or a scheduling grant for the user equipment (UE) 104. The encoder 105 may encode the data 101, which may then be provided to the transmitter 113. The transmitter 113 may modulate the encoded data using the modulator 115. The transmitter 113 may transmit the modulated data to the user equipment (UE) 104 using one or more antennas 197a-n.

When carrier aggregation is configured, a user equipment (UE) 104 may have only one Radio Resource Control (RRC) connection with the network. At the RRC connection establishment/re-establishment/handover, one serving cell (i.e., the primary cell (PCell) 185a) provides the non-access stratum (NAS) mobility information (e.g., Tracking Area Identity (TAI)) and the security input.

In the downlink, the carrier corresponding to the primary cell (PCell) 185a is the downlink primary component carrier (DL PCC) 108. In the uplink, the carrier corresponding to the primary cell (PCell) 185a is the uplink primary component carrier (UL PCC) 106. Depending on the capabilities of the user equipment (UE) 104, one or more secondary component carriers (SCC) or secondary cells (SCell) 185b may be configured to form a set of serving cells with the primary cell (PCell) 185a. In the downlink, the carrier corresponding to the secondary cell (SCell) 185b is the downlink secondary component carrier (DL SCC) 112. In the uplink, the carrier corresponding to the secondary cell (SCell) 185b is the uplink secondary component carrier (UL SCC) 110. The number of downlink component carriers 108, 112 may be different from the number of uplink component carriers 106, 110 because multiple cells may share one uplink component carrier 106, 110.

If carrier aggregation is configured, a user equipment (UE) 104 may have multiple serving cells: a primary cell (PCell) 185a and one or more secondary cells (SCell) 185b. From a network perspective, the same serving cell may be used as the primary cell (PCell) 185a by one user equipment (UE) 104 and used as a secondary cell (SCell) 185b by another user equipment (UE) 104. A primary cell (PCell) 185a that is operating according to Release-8/9 is equivalent to the Release-8/9 serving cell. When operating according to Release-10, there may be one or more secondary cells (SCell) 185b in addition to the primary cell (PCell) 185a if carrier aggregation is configured.

A number of spatial channels may be available on each serving cell by using multiple antennas at a transmitter and a receiver. Therefore, multiple codewords (up to two codewords) may be transmitted simultaneously. If the user equipment (UE) 104 is configured with five component carriers (cells) and two codewords for each of the component carriers (cells), ten HARQ-ACK 140 acknowledgement/negative acknowledgement (ACK/NACK) bits for a single downlink subframe may be generated by the user equipment (UE) 104. One benefit of using carrier aggregation is that additional downlink and/or uplink data may be transmitted. As a result of the additional downlink data, additional uplink control information (UCI) may be needed.

It has been agreed that for periodic CQI/PMI/RI 141 reporting for carrier aggregation, the configuration of different (in time) physical uplink control channel (PUCCH) resources for reports for each component carrier (CC) is supported. It has also been agreed that for Release-10 user equipments (UEs) 104 that support up to four HARQ-ACK 140 bits, physical uplink control channel (PUCCH) Format 1b with channel selection should be used. For Release-10 user equipments (UEs) 104 that support more than four HARQ-ACK 140 bits, physical uplink control channel (PUCCH) Format 1b with channel selection can be used for up to four HARQ-ACK 140 bits and Format 3 is supported for all HARQ-ACK 140 bit ranges. Format 3 is a new format for LTE-A, which can carry 48 coded bits. Format 3 is based on a discrete Fourier Transform spread orthogonal frequency division multiplexing (DFT-S-OFDM) structure.

In Release-8/9, the maximum number of bits for HARQ-ACK 140 is two bits for frequency division duplexing (FDD) using Format 1b or Format 2/2b and four bits for time division duplexing (TDD) using Format 1b with channel selection. For frequency division duplexing (FDD), a user equipment (UE) 104 may determine the number of configured serving cells and the downlink transmission modes configured for each serving cell. A user equipment (UE) 104 may use two HARQ-ACK 140 bits for a serving cell configured with a downlink transmission mode that supports up to two transport blocks (codewords), and one HARQ-ACK 140 bit otherwise. A user equipment (UE) 104 that supports more than four ACK/NACK bits may be configured by higher layer 118 signaling to use either physical uplink control channel (PUCCH) Format 1a/1b with channel selection or physical uplink control channel (PUCCH) Format 3 for transmission of the HARQ-ACK 140.

Figure 2:
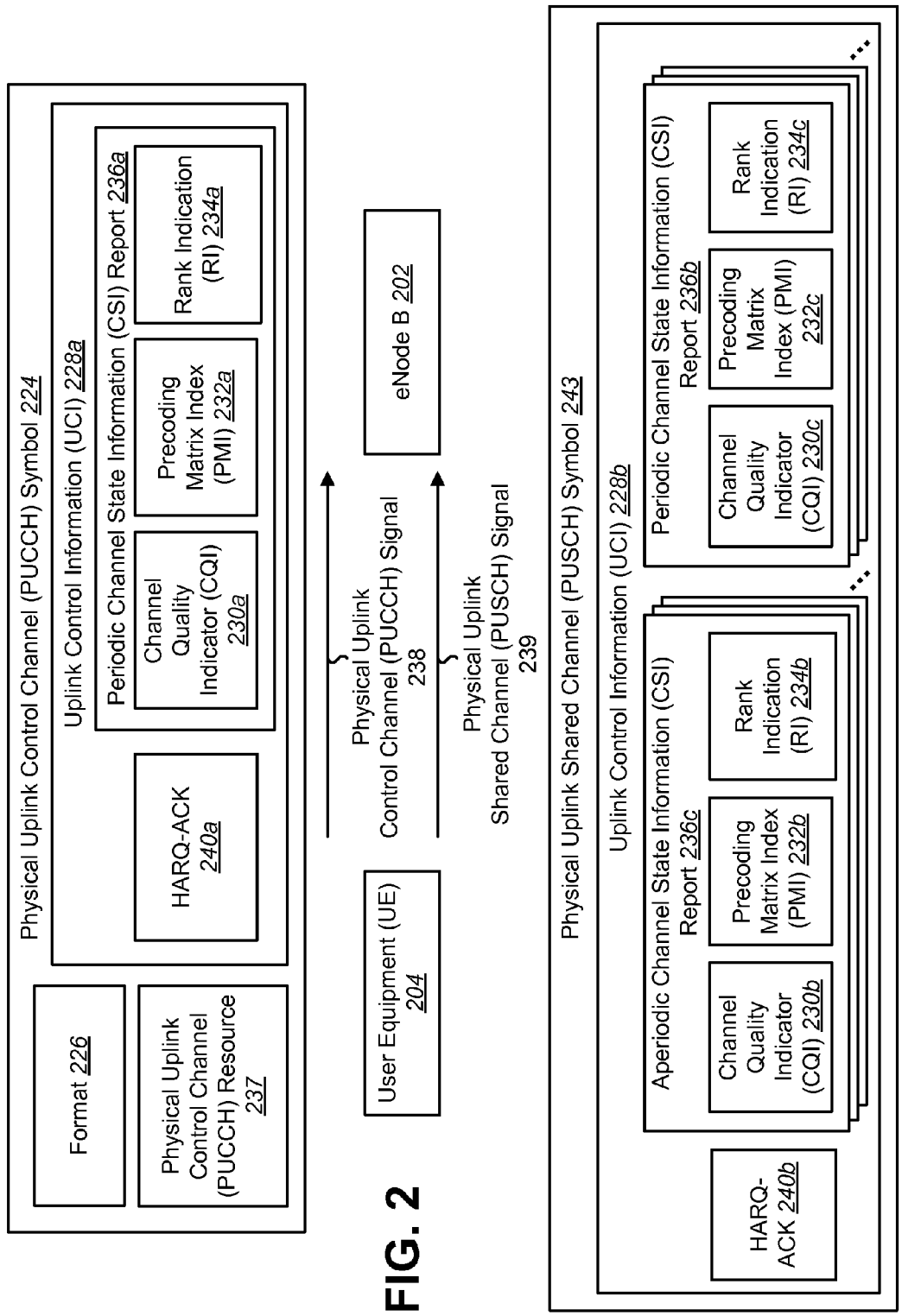
FIG. 2 is a block diagram illustrating transmissions from a user equipment (UE) to an eNode B during a subframe.

FIG. 2 is a block diagram illustrating transmissions from a user equipment (UE) 204 to an eNode B 202 during a subframe. The user equipment (UE) 204 may transmit a physical uplink control channel (PUCCH) symbol 224 via a physical uplink control channel (PUCCH) symbol 238 to the eNode B 202. The user equipment (UE) 204 may also transmit a physical uplink shared channel (PUSCH) symbol 243 via a physical uplink shared channel (PUSCH) symbol 239 to the eNode B 202. In one configuration, the user equipment (UE) 204 may simultaneously transmit a physical uplink control channel (PUCCH) symbol 224 and a physical uplink shared channel (PUSCH) symbol 243 to the eNode B 202.

Simultaneous transmission on the physical uplink control channel (PUCCH) and the physical uplink shared channel (PUSCH) was introduced in Release-10. In Release-8 and Release-9, simultaneous transmission on the physical uplink control channel (PUCCH) and the physical uplink shared channel (PUSCH) is not allowed. Thus, all references to simultaneous transmission on the physical uplink control channel (PUCCH) and the physical uplink shared channel (PUSCH) are related to Release-10, and not to Release-8 or Release-9.

The physical uplink control channel (PUCCH) symbol 224 may include uplink control information (UCI) 228a. The uplink control information (UCI) 228a may include an HARQ-ACK 240a. The uplink control information (UCI) 228a may also include a periodic channel state information (CSI) report 236a. A channel state information (CSI) report 236 refers to the channel state information (CSI) of each of the downlink carrier components. The periodic channel state information (CSI) report 236a may include a channel quality indicator (CQI) 230a, a precoding matrix index (PMI) 232a, and/or a rank indication (RI) 234a. When a physical uplink shared channel (PUSCH) symbol 243 is scheduled for transmission, the user equipment (UE) 204 does not generate a scheduling request (SR). Thus, the uplink control information (UCI) 228a does not include a scheduling request (SR).

The CQI/PMI/RI 141 may be scheduled on the physical uplink control channel (PUCCH) periodically by higher layer 118 signaling (the CQI/PMI/RI 141 is periodic CQI/PMI/RI 141). The eNode B 102 may also request transmission of CQI/PMI/RI 141. Such a request may be made through the physical downlink control channel (PDCCH) and the CQI/PMI/RI reported in response to such a request may be referred to as aperiodic CQI/PMI/RI 141. The physical uplink control channel (PUCCH) symbol 224 may be sent only on the primary cell (PCell) 185a. The HARQ-ACK 240a is generated dynamically based on the detection of a physical downlink shared channel (PDSCH). A collision may occur between the schedule for transmission of a periodic CQI/PMI/RI 141 and an HARQ-ACK 240a in the same subframe.

The physical uplink control channel (PUCCH) symbol 224 may further include a format 226 for which the physical uplink control channel (PUCCH) symbol 224 was transmitted. For example, the physical uplink control channel (PUCCH) symbol 224 may be transmitted using Format 1/1a/1b, Format 2/2a/2b, Format 3/3a/3b or any other new formats. As used herein, Format 1/1a/1b represents Format 1 and/or Format 1a and/or Format 1b. Also, as used herein, Format 2/2a/2b represents Format 2 and/or Format 2a and/or Format 2b. Herein, Format 3/3a/3b represents Format 3 and/or Format 3a and/or Format 3b.

Format 3a/3b is not currently defined in the 3GPP specification. Format 3a and 3b are analogues to Format 2a and 2b as defined by 3GPP. In a subframe with Format 3a, additional control information may be carried on one of the two reference signals of the subframe using Binary Phase Shift Keying (BPSK) modulation. In a subframe with Format 3b, additional control information may be carried on one of the two reference signals of the subframe using Quadrature Phase Shift Keying (QPSK) modulation.

The physical uplink control channel (PUCCH) symbol 224 may also include a physical uplink control channel (PUCCH) resource 237. The physical uplink control channel (PUCCH) resource 237 for the periodic CQI/PMI/RI 141 may be periodically pre-assigned by a higher layer 118, which uses Format 2/2a/2b. The eNode B 202 may dynamically allocate the physical downlink shared channel (PDSCH); the HARQ-ACK 240a is then dynamically generated in a subframe. Therefore, sometimes the periodic CQI/PMI/RI 141 may collide with the HARQ-ACK 240a in the same subframe.

To avoid dropping one of them in collisions between a periodic CQI/PMI/RI 141 and an HARQ-ACK 240a, the periodic CQI/PMI/RI 141 may be multiplexed with the HARQ-ACK 240a on the physical uplink control channel (PUCCH). This is because of the single carrier property for uplink in an LTE system (i.e., a user equipment (UE) 204 should not transmit multiple channels simultaneously on one component carrier). Format 3 may be used for multiplexing the periodic CQI/PMI/RI 141 with the HARQ-ACK 240a. If the periodic CQI/PMI/RI 141 and the HARQ-ACK 240a are not multiplexed, the periodic CQI/PMI/RI 141 may be dropped by the user equipment (UE) 204. Thus, one benefit of using Format 3 is that the CQI/PMI/RI 141 may be multiplexed with the HARQ-ACK 240a, allowing for the uplink transmission of additional data.

A user equipment (UE) 204 that supports up to four ACK/NACK bits can use physical uplink control channel (PUCCH) Format 1a/1b with channel selection for transmission of the HARQ-ACK 240a. A user equipment (UE) 204 that supports more than four ACK/NACK bits is configured by higher layer 118 signaling to use either physical uplink control channel (PUCCH) Format 1a/1b with channel selection or physical uplink control channel (PUCCH) Format 3 for transmission of the HARQ-ACK 240a. A user equipment (UE) 204 may determine the number of HARQ-ACK 240a bits based on the number of configured serving cells and the downlink transmission modes configured for each serving cell. A user equipment (UE) 204 may use two HARQ-ACK 240a bits for a serving cell configured with a downlink transmission mode that supports up to two transport blocks (codewords) and one HARQ-ACK 240a bit otherwise.

For physical uplink control channel (PUCCH) Format 3, a user equipment (UE) 204 may transmit a NACK for a DTX HARQ-ACK 240a response for a transport block (codeword) associated with a configured serving cell. DTX means that the user equipment (UE) 204 has missed the downlink assignment.

The physical uplink shared channel (PUSCH) symbol 243 may also include uplink control information (UCI) 228b. The uplink control information (UCI) 228b may include the ACK/NACK information corresponding to the transmission of data in the downlink (such as an HARQ-ACK 240b), one or more aperiodic channel state information (CSI) reports 236c and one or more periodic channel state information (CSI) reports 236b. The number of aperiodic channel state information (CSI) reports 236c and the number of periodic channel state information (CSI) reports 236b may be signaled by the eNode B 202 via radio resource control (RRC) signaling. An aperiodic channel state information (CSI) report 236c may include a channel quality indicator (CQI) 230b, a precoding matrix index (PMI) 232b and a rank indication (RI) 234b. An aperiodic channel state information (CSI) report 236c is always transmitted on the physical uplink shared channel (PUSCH) symbol 243. A periodic channel state information (CSI) report 236b may also include a channel quality indicator (CQI) 230c, a precoding matrix index (PMI) 232c and a rank indication (RI) 234c. The physical uplink shared channel (PUSCH) symbol 243 may be sent on the primary cell (PCell) 185a and/or on one or more secondary cells (SCell) 185b. The HARQ-ACK 240 is generated dynamically based on the detection of a physical downlink shared channel (PDSCH).

Figure 3:
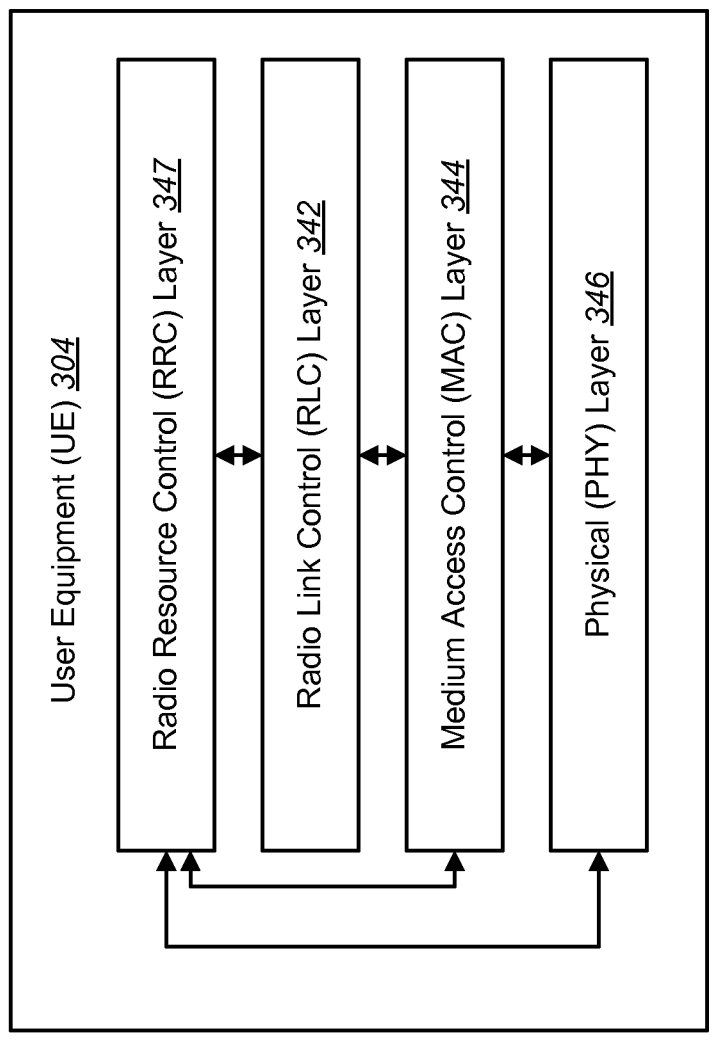
FIG. 3 is a block diagram illustrating the layers used by a user equipment (UE)

FIG. 3 is a block diagram illustrating the layers used by a user equipment (UE) 304. The user equipment (UE) 304 of FIG. 3 may be one configuration of the user equipment (UE) 104 of FIG. 1. The user equipment (UE) 304 may include a radio resource control (RRC) layer 347, a radio link control (RLC) layer 342, a medium access control (MAC) layer 344 and a physical (PHY) layer 346. These layers may be referred to as higher layers 118. The user equipment (UE) 304 may include additional layers not shown in FIG. 3.

Figure 4:
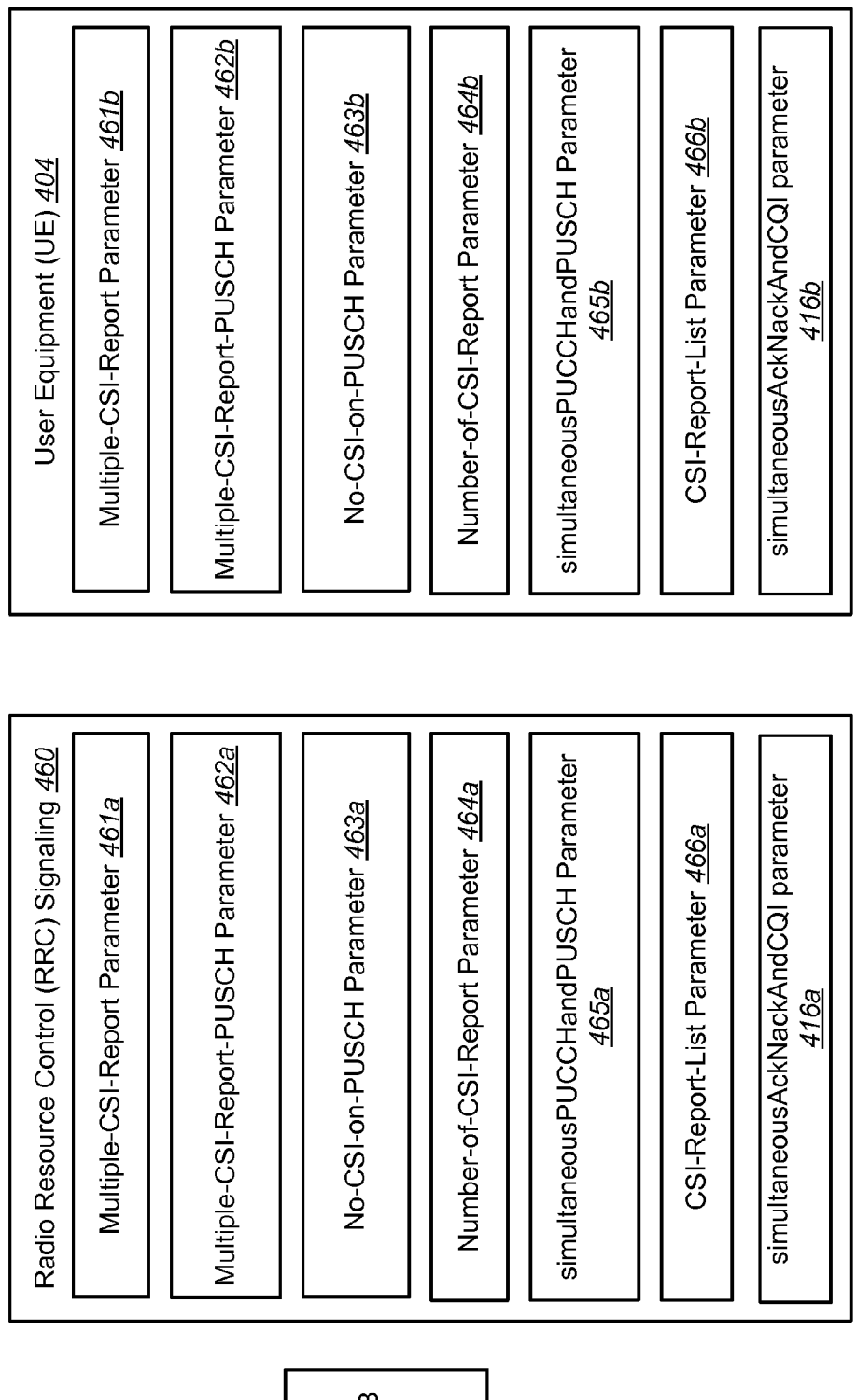
FIG. 4 is a block diagram illustrating communications from an eNode B to a user equipment (UE)

FIG. 4 is a block diagram illustrating communications from an eNode B 402 to a user equipment (UE) 404. The eNode B 402 of FIG. 4 may be one configuration of the eNode B 102 of FIG. 1. The user equipment (UE) 404 of FIG. 4 may be one configuration of the user equipment (UE) 104 of FIG. 1. The eNode B 402 may control the uplink control information (UCI) 228 reporting of the user equipment (UE) 404 using radio resource control (RRC) signaling 460. By using radio resource control (RRC) signaling 460, channel state information (CSI) reporting may be controlled in a timely manner without unnecessarily delaying the reporting.

Depending on parameters in the radio resource control (RRC) signaling 460, the transmission of the remaining periodic channel state information (CSI) reports 236b on the physical uplink shared channel (PUSCH) may be none, one or all. There are two cases for this: 1) the physical uplink control channel (PUCCH) and the physical uplink shared channel (PUSCH) are scheduled for simultaneous transmission or 2) only the physical uplink shared channel (PUSCH) is scheduled for transmission. In case 1, the ACK/NACK (such as the HARQ-ACK 140) and possibly none, one or some periodic channel state information (CSI) reports 236a-b are transmitted on the physical uplink control channel (PUCCH) and none, all or some of the remaining channel state information (CSI) reports 236 may be transmitted on the physical uplink shared channel (PUSCH).

By defining additional radio resource control (RRC) signaling 460 parameters, a more granular and flexible method for determining the number of periodic channel state information (CSI) reports 236b that are going to be transmitted on the physical uplink shared channel (PUSCH) may be achieved.

The radio resource control (RRC) signaling 460 may include a Multiple-CSI-Report parameter 461a. The Multiple-CSI-Report parameter 461a may be a user equipment (UE) 404 specific on/off (or Boolean true/false or binary valued from the set {0, 1}) parameter. The Multiple-CSI-Report parameter 461a allows multiple periodic channel state information (CSI) reports 236a-b to be reported on the physical uplink control channel (PUCCH) and the physical uplink shared channel (PUSCH). The Multiple-CSI-Report parameter 461a may only be used by the user equipment (UE) 404 when simultaneous transmission of the physical uplink control channel (PUCCH) and the physical uplink shared channel (PUSCH) is allowed.

The radio resource control (RRC) signaling 460 may also include a Multiple-CSI-Report-PUSCH parameter 462a. The Multiple-CSI-Report-PUSCH parameter 462a may also be a user equipment (UE) 404 specific on/off (or Boolean true/false or binary valued from the set {0, 1}) parameter. The Multiple-CSI-Report-PUSCH parameter 462a allows multiple periodic channel state information (CSI) reports 236b to be reported on the physical uplink shared channel (PUSCH).

Transmission of multiple periodic channel state information (CSI) reports 236a-b may increase the ability of an eNode B 402 to perform accurate frequency selective scheduling, which is turn may increase the throughput of the system and/or the user equipment (UE). By introducing the Multiple-CSI-Report-PUSCH parameter 462a in addition to the Multiple-CSI-Report parameter 461a, the eNode B 402 may have more flexibility to transmit multiple periodic channel state information (CSI) reports 236a-b under different transmission modes (i.e., the transmission mode in which only the physical uplink shared channel (PUSCH) is scheduled for transmission and the transmission mode in which both the physical uplink control channel (PUCCH) and the physical uplink shared channel (PUSCH) are scheduled for transmission).

If used together, the two parameters may provide a finer scheduling capability for the transmission of uplink control information (UCI) 228 on the physical uplink control channel (PUCCH) and the physical uplink shared channel (PUSCH). However, the Multiple-CSI-Report parameter 461a and the Multiple-CSI-Report-PUSCH parameter 462a may each be used independently to increase the capability of the user equipment (UE) 404 in transmitting periodic multiple channel state information (CSI) reports 236a-b.

When both the physical uplink control channel (PUCCH) and the physical uplink shared channel (PUSCH) are available, one periodic channel state information (CSI) report 236a may be transmitted on the physical uplink control channel (PUCCH). Therefore, even if only one periodic channel state information (CSI) report 236b is transmitted on the physical uplink shared channel (PUSCH), multiple periodic channel state information (CSI) reports 236a-b are transmitted.

There are two cases for transmitting periodic channel state information (CSI) reports 236a-b: 1) the periodic channel state information (CSI) reports 236b are only transmitted on the physical uplink shared channel (PUSCH) or 2) the periodic channel state information (CSI) reports 236a-b are transmitted on both the physical uplink shared channel (PUSCH) and the physical uplink control channel (PUCCH).

Case 1 also exists in Rel-8/9, with the difference being that in Rel-8/9, only one periodic channel state information (CSI) report 236b might be needed to be transmitted on the physical uplink shared channel (PUSCH). But in Rel-10, there might be up to five periodic channel state information (CSI) reports 236a-b. Also, in Rel-8/9, there is a possibility that the user equipment (UE) 104 drops the periodic channel state information (CSI) report 236b and does not transmit the periodic channel state information (CSI) report 236b on the physical uplink shared channel (PUSCH).

Moreover, Rel-10 is required to be backwards compatible. Therefore, Rel-10 needs to support the transmission of none and one periodic channel state information (CSI) report 236b on the physical uplink shared channel (PUSCH) (in order to be compatible with Rel-8/9). As a functionality for Rel-10, it may be necessary for the user equipment (UE) 104 to transmit all of the periodic channel state information (CSI) reports 236b on the physical uplink shared channel (PUSCH). With the Multiple-CSI-Report-PUSCH parameter 462, the eNode B 402 may signal a user equipment (UE) 404 to transmit one or all periodic channel state information (CSI) reports 236 on the physical uplink shared channel.

The Multiple-CSI-Report parameter 461 does not specify how many periodic channel state information (CSI) reports 236b are going to be transmitted on the physical uplink shared channel (PUSCH). Since it is possible to transmit one periodic channel state information (CSI) report 236a on the physical uplink control channel (PUCCH), multiple periodic channel state information (CSI) reports 236a-b may be transmitted if one or more of the remaining periodic channel state information (CSI) reports 236b are transmitted on the physical uplink shared channel (PUSCH). Therefore, if the eNode B 402 decides to limit the transmission of periodic channel state information (CSI) reports 236b on the physical uplink shared channel (PUSCH), it can be done via the Multiple-CSI-Report-PUSCH parameter 462.

Figure 7:
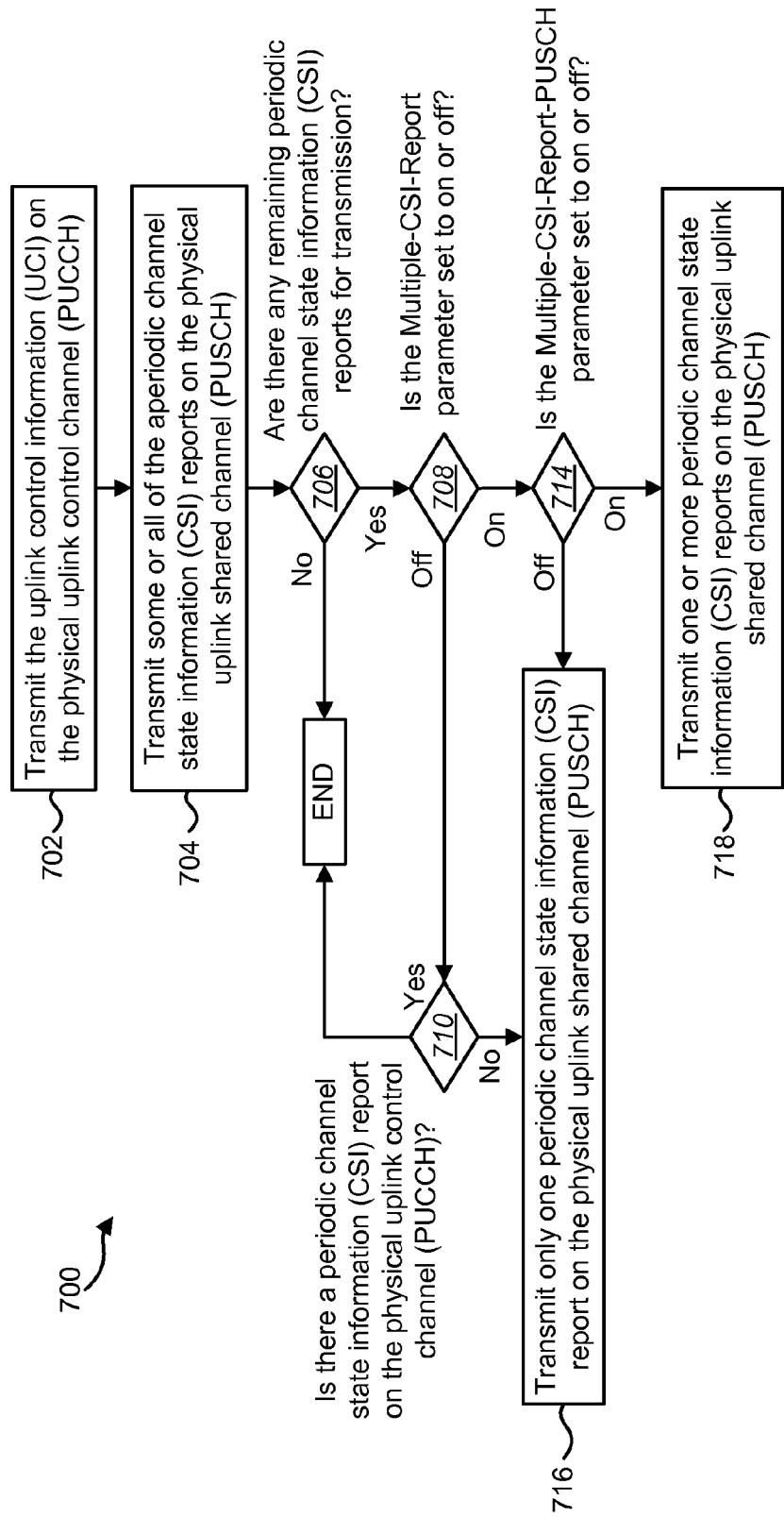
FIG. 7 is a flow diagram of a method for simultaneously transmitting uplink control information (UCI) on the physical uplink control channel (PUCCH) and the physical uplink shared channel (PUSCH) using both the Multiple-CSI-Report parameter and the Multiple-CSI-Report-PUSCH parameter.
Figure 8:
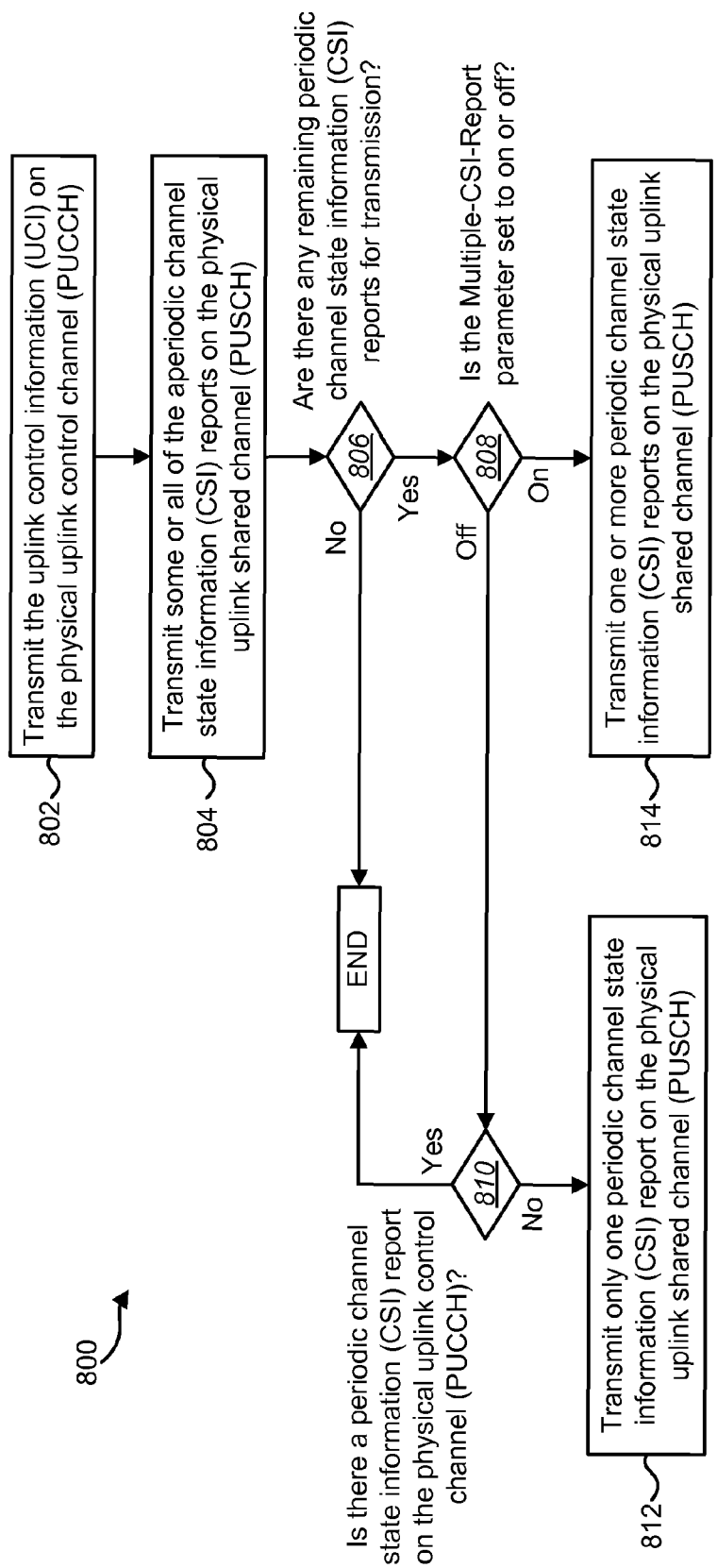
FIG. 8 is a flow diagram of a method for simultaneously transmitting uplink control information (UCI) on the physical uplink control channel (PUCCH) and the physical uplink shared channel (PUSCH) using only the Multiple-CSI-Report parameter.
Figure 9:
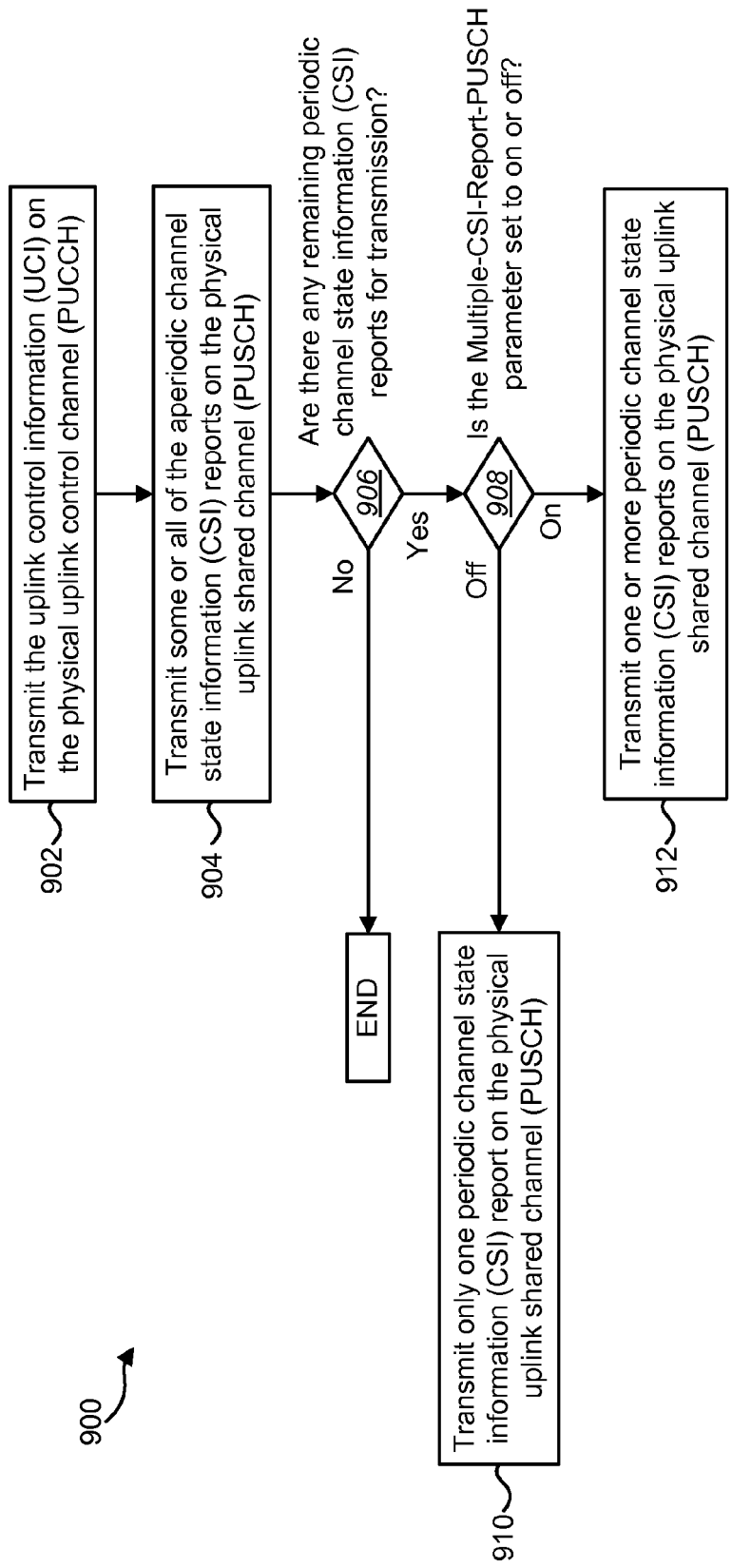
FIG. 9 is a flow diagram of a method for simultaneously transmitting uplink control information (UCI) on the physical uplink control channel (PUCCH) and the physical uplink shared channel (PUSCH) using only the Multiple-CSI-Report-PUSCH parameter.
Figure 10:
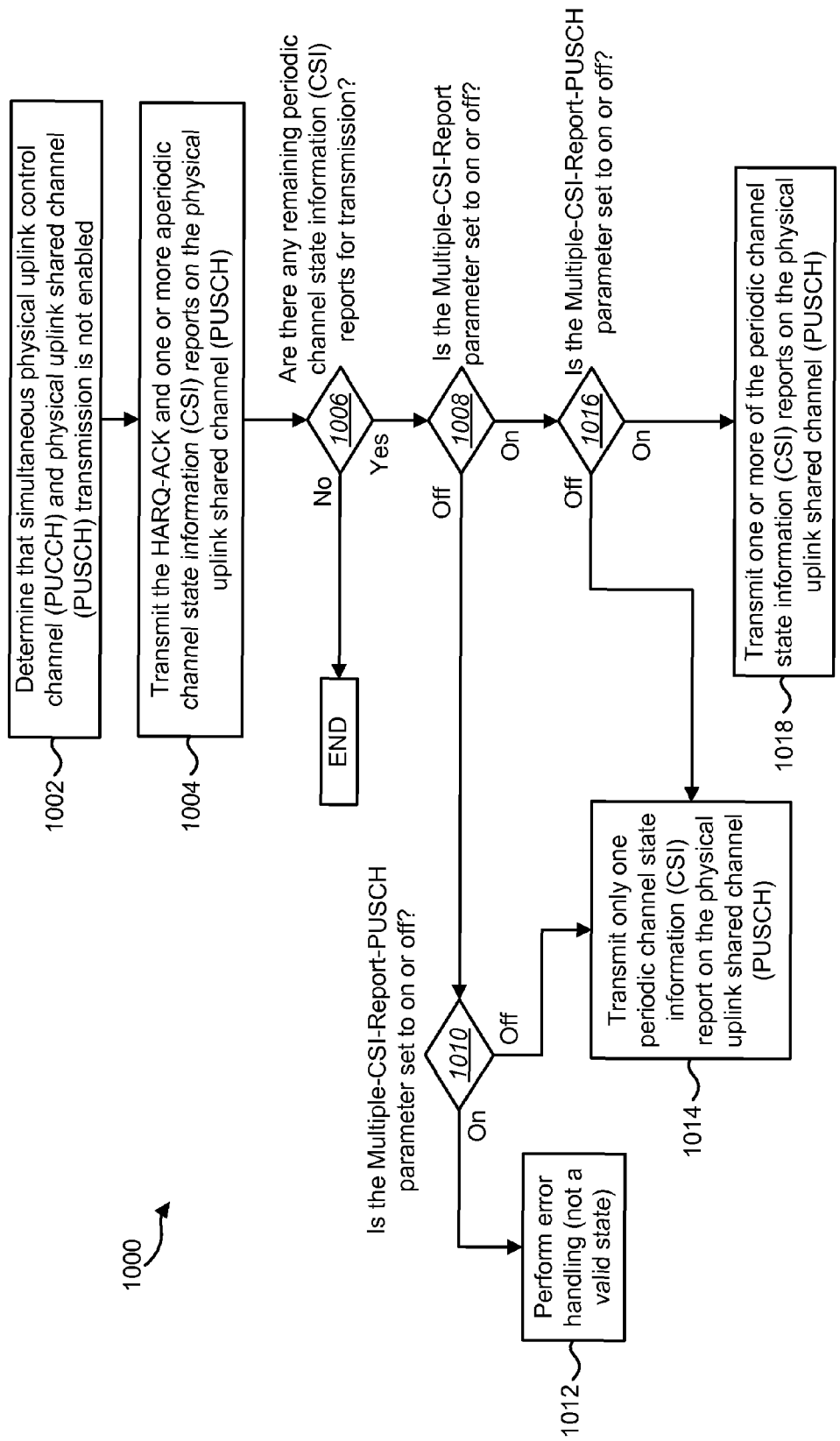
FIG. 10 is a flow diagram of a method for transmitting uplink control information (UCI) on the physical uplink shared channel (PUSCH) using both the Multiple-CSI-Report parameter and the Multiple-CSI-Report-PUSCH parameter.
Figure 11:
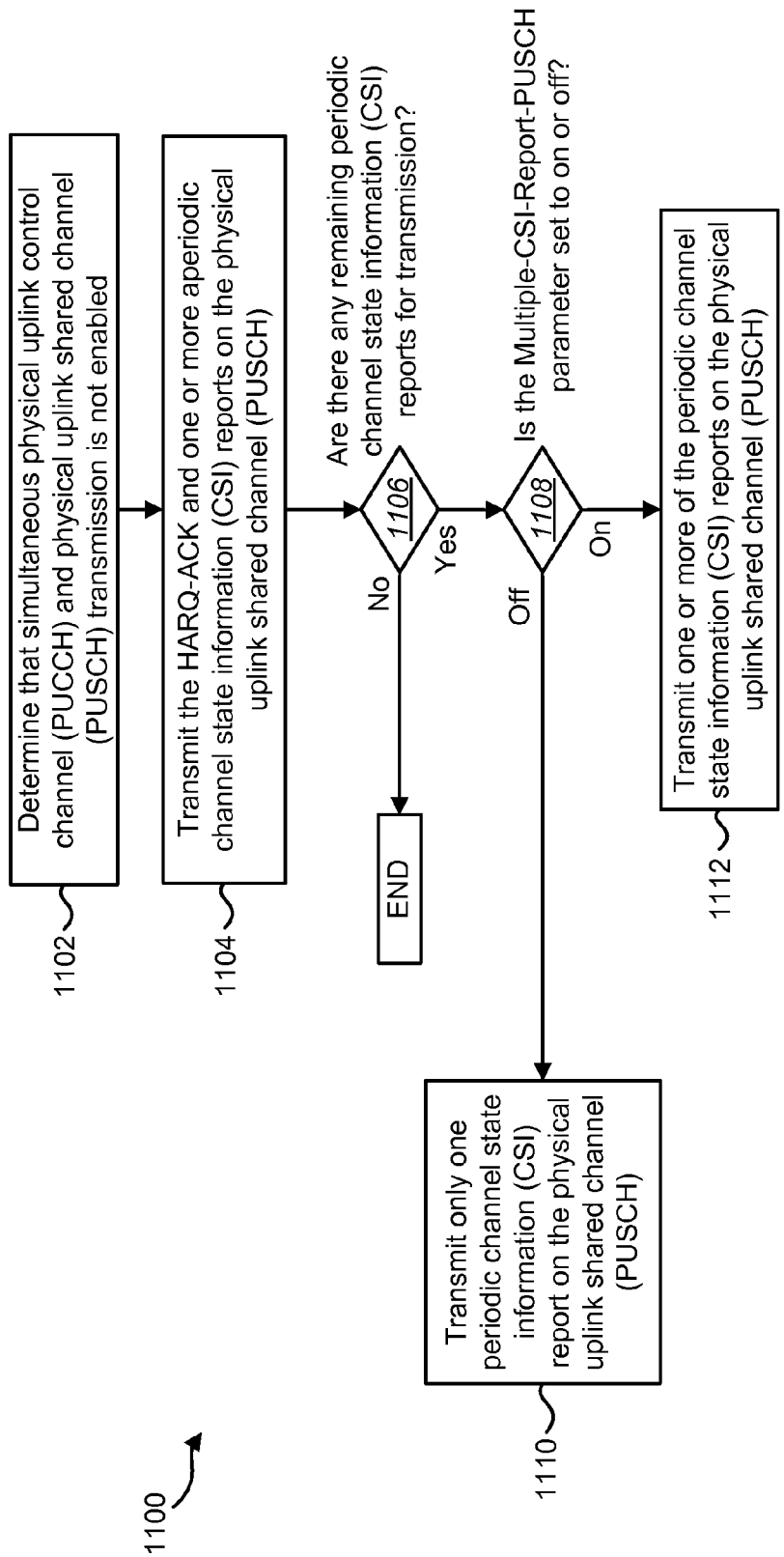
FIG. 11 is a flow diagram of a method for transmitting uplink control information (UCI) on the physical uplink shared channel (PUSCH) using only the Multiple-CSI-Report parameter.
Figure 12:
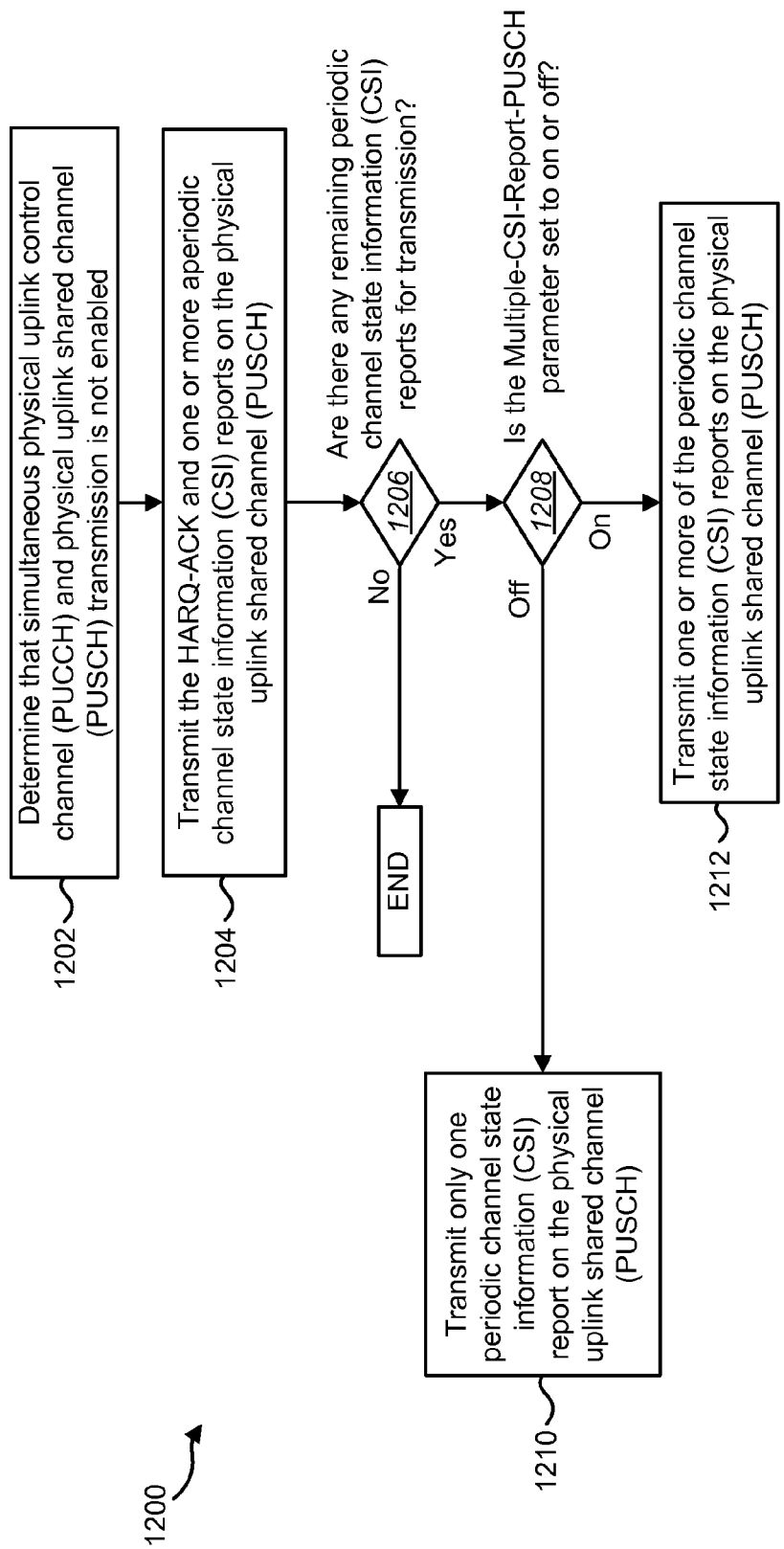
FIG. 12 is a flow diagram of a method for transmitting uplink control information (UCI) on the physical uplink shared channel (PUSCH) using only the Multiple-CSI-Report parameter.

In FIG. 7 and FIG. 10 below, both the Multiple-CSI-Report parameter 461a and the Multiple-CSI-Report-PUSCH parameter 462a may be used to signal resource usage of the user equipment (UE) 404. In FIG. 8 and FIG. 11 below, only the Multiple-CSI-Report parameter 461a is used to signal resource usage of the user equipment (UE) 404. In FIG. 9 and FIG. 12 below, only the Multiple-CSI-Report-PUSCH parameter 462a is used to signal resource usage of the user equipment (UE) 404.

The radio resource control (RRC) signaling 460 may also include a No-CSI-on-PUSCH parameter 463a. The No-CSI-on-PUSCH parameter 463a may be a Boolean parameter that overrides the Multiple-CSI-Report parameter 461a and the Multiple-CSI-Report-PUSCH parameter 462a. If the No-CSI-on-PUSCH parameter 463a is set to true (or 'on' or a logical 1), then no periodic channel state information (CSI) reports 236b are transmitted on the physical uplink shared channel (PUSCH). When the No-CSI-on-PUSCH parameter 463a is set to false (or 'off' or a logical 0), then the transmission of periodic channel state information (CSI) reports 236b on the physical uplink shared channel (PUSCH) is determined by the Multiple-CSI-Report parameter 461a and the Multiple-CSI-Report-PUSCH parameter 462a. This may be applied to both case 1 and case discussed above (i.e., only the physical uplink shared channel (PUSCH) is scheduled for transmission or both the physical uplink shared channel (PUSCH) and the physical uplink control channel (PUCCH) are scheduled for simultaneous transmission).

If the Multiple-CSI-Report parameter 461b and the Multiple-CSI-Report-PUSCH parameter 462b do not exist on a user equipment (UE) 404 (or are not defined in a system), the user equipment (UE) 404 may interpret the No-CSI-on-PUSCH parameter 463a using one of two methods. This allows the No-CSI-on-PUSCH parameter 463a to be an independent parameter. In a first method, when the No-CSI-on-PUSCH parameter 463a is false, the user equipment (UE) 404 may transmit all periodic channel state information (CSI) reports 236b on the physical uplink shared channel (PUSCH) and no periodic channel state information (CSI) reports 236a are transmitted on the physical uplink control channel (PUCCH) (this is only valid for simultaneous transmission on both the physical uplink shared channel (PUSCH) and the physical uplink control channel (PUCCH)). When the No-CSI-on-PUSCH parameter 463a is true, no periodic channel state information (CSI) reports 236b are transmitted on the physical uplink shared channel (PUSCH) (this is valid for transmission on only the physical uplink shared channel (PUSCH) and simultaneous transmission on both the physical uplink shared channel (PUSCH) and the physical uplink control channel (PUCCH)).

In a second method, when the No-CSI-on-PUSCH parameter 463a is false, the remaining periodic channel state information (CSI) reports 236b are transmitted on the physical uplink shared channel (PUSCH) after the physical uplink control channel (PUCCH) transmissions procedure (i.e., the method illustrated below in relation to FIG. 6) is finished (this is only valid for simultaneous transmission on both the physical uplink shared channel (PUSCH) and the physical uplink control channel (PUCCH)). When the No-CSI-on-PUSCH parameter 463a is true, no periodic channel state information (CSI) reports 236b are transmitted on the physical uplink shared channel (PUSCH) (this is valid for transmission on only the physical uplink shared channel (PUSCH) and simultaneous transmission on both the physical uplink shared channel (PUSCH) and the physical uplink control channel (PUCCH)).

The radio resource control (RRC) signaling 460 may also include the simultaneousPUCCHandPUSCH parameter 465a. The simultaneousPUCCHandPUSCH parameter 465a indicates whether uplink control information (UCI) 228 transmission is on only the physical uplink shared channel (PUSCH) or on both the physical uplink shared channel (PUSCH) and the physical uplink control channel (PUCCH). If the simultaneousPUCCHandPUSCH parameter 465a is true, simultaneous transmission on both the physical uplink shared channel (PUSCH) and the physical uplink control channel (PUCCH) is enabled. If the simultaneousPUCCHandPUSCH parameter 465a is false, transmission on both the physical uplink shared channel (PUSCH) and the physical uplink control channel (PUCCH) is not enabled. The radio resource control (RRC) signaling 460 may also include the simultaneousAckNackAndCQI parameter 416a.

The radio resource control (RRC) signaling 460 may further include a CSI-Report-List parameter 466a. The CSI-Report-List parameter 466a is a bit map that may be used in case of a collision among multiple channel state information (CSI) reports 236. The size of the CSI-Report-List parameter 466a may be the same as the number of configured cells (carrier components). There may be a one-to-one correspondence between the bits in the CSI-Report-List parameter 466a and the configured cells (carrier components). If a bit in the CSI-Report-List parameter 466a has the value of 1, the aperiodic channel state information (CSI) report 236c of the corresponding cell (carrier component) may be transmitted when there are multiple channel state information (CSI) reports 236 available to be reported. The CSI-Report-List parameter 466a can be used primarily for the transmission of aperiodic channel state information (CSI) reports 236c on the physical uplink shared channel (PUSCH) but may also be used for the transmission of periodic channel state information (CSI) reports 236b on the physical uplink shared channel (PUSCH). If there is only one channel state information (CSI) report 236 available for transmission and the corresponding bit in the CSI-Report-List parameter 466a has a value of 0 (indicating no transmission), the user equipment (UE) 404 may ignore the CSI-Report-List parameter 466a and transmit the channel state information (CSI) report 236.

Transmission of the uplink control information (UCI) 228 on the physical uplink shared channel (PUSCH) may reduce the amount of data that can be transmitted on the physical uplink shared channel (PUSCH) by using the limited resources on the physical uplink shared channel (PUSCH) for transmitting control information. Therefore, there is a tradeoff between obtaining more accurate channel state information (CSI) and the amount of data being transmitted. The CSI-Report-List parameter 466a may give the eNode B 402 the highest control the uplink control information (UCI) 228 transmitted by the user equipment (UE) 404. The flexibility of the eNode B 402 may increase its ability to tradeoff the control information with data in the uplink as well as improve the downlink frequency selective scheduling.

Instead of using a bit map like the CSI-Report-List parameter 466a, a Number-of-CSI-Report parameter 464 may be used. The Number-of-CSI-Report parameter 464a may indicate the number of channel state information (CSI) reports 236 that can be reported for cases when the user equipment (UE) 404 has multiple channel state information (CSI) reports 236 to transmit. The Number-of-CSI-Report parameter 464a has the smallest integer larger than log 2(maximum number of downlink cells), where log 2 denotes a logarithm to the base of 2.

Using the Number-of-CSI-Report parameter 464a, the benefits of the CSI-Report-List parameter 466a may be achieved while transmitting fewer bits. The transmission of uplink control information (UCI) on the physical uplink shared channel (PUSCH) may reduce the amount of data that can be transmitted on the physical uplink shared channel by using the limited resources on the physical uplink shared channel (PUSCH) for transmitting control information. Therefore, there is a tradeoff between obtaining more accurate channel state information (CIS) and the amount of data being transmitted. The Number-of-CSI-Report parameter 464a may increase the eNode B's 402 control on the uplink control information (UCI) 228 transmitted by the user equipment (UE) 404. The flexibility of the eNode B 402 increases its ability to tradeoff the control information with data in the uplink, as well as improving the downlink frequency selective scheduling.

For example, in an LTE-Advanced case with at most five downlink cells, the length of the Number-of-CSI-Report parameter 464a may be 3 bits (log 2(5)=2.32). The user equipment (UE) 404 may report at most as many channel state information (CSI) reports 236 as indicated by the Number-of-CSI-Report parameter 464a based on a predefined order. The Number-of-CSI-Report parameter 464a is primarily used for the transmission of aperiodic channel state information (CSI) reports 236c on the physical uplink shared channel (PUSCH) but may also be used for the transmission of periodic channel state information (CSI) reports 236b on the physical uplink shared channel (PUSCH).

The user equipment (UE) 404 may receive the radio resource control (RRC) signaling 460 from the eNode B 402. The user equipment (UE) 404 may then store those parameters received in the radio resource control (RRC) signaling 460. For example, the user equipment (UE) 404 may store the Multiple-CSI-Report parameter 461b, the Multiple-CSI-Report-PUSCH parameter 462b, the No-CSI-on-PUSCH parameter 463b, the simultaneousPUCCHandPUSCH parameter 465b, the CSI-Report-List parameter 466b, the Number-of-CSI-Report parameter 464b and the simultaneousAckNackAndCQI parameter 416b.

Figure 5:
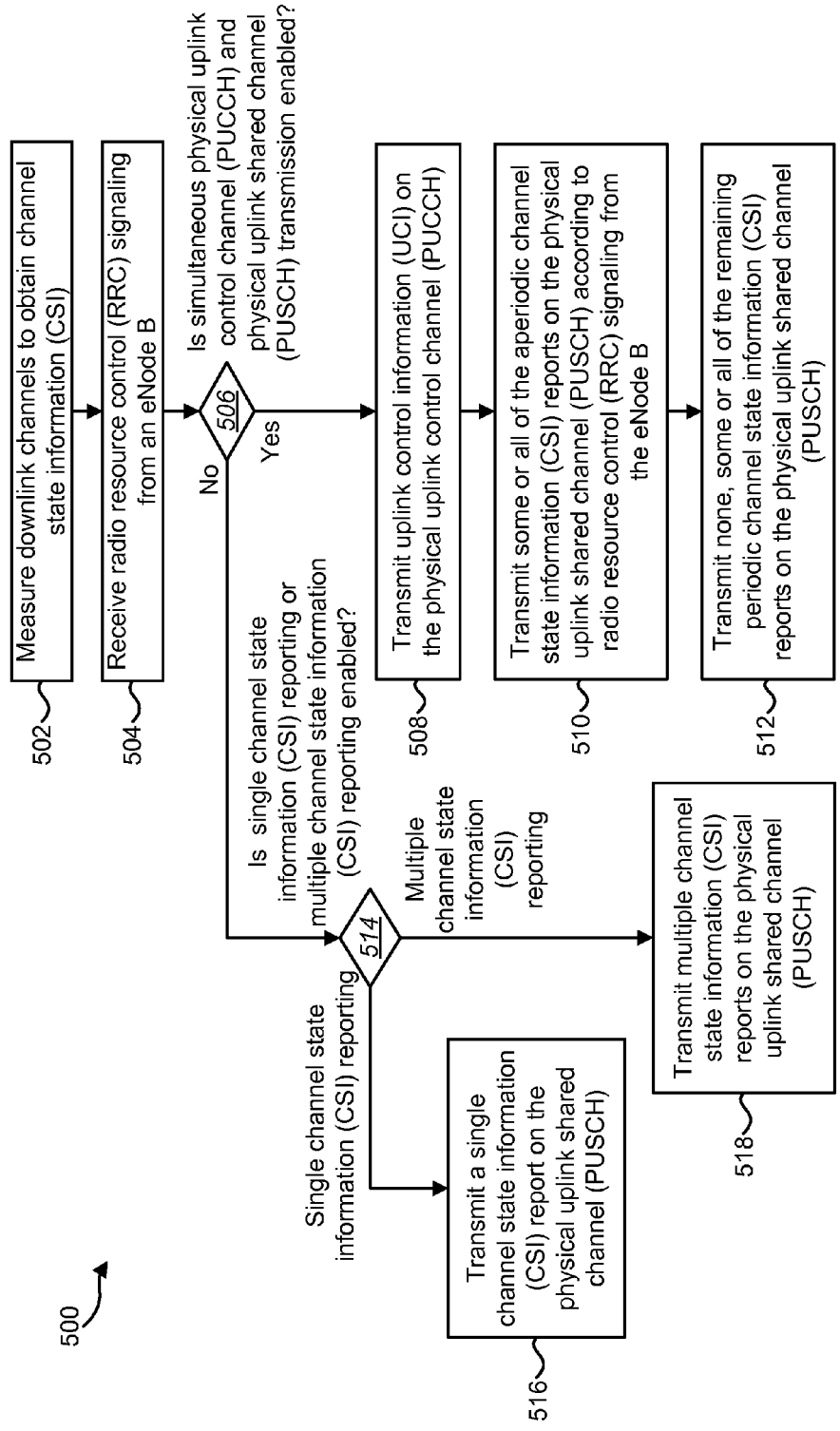
FIG. 5 is a flow diagram of a method for transmitting uplink control information (UCI)

FIG. 5 is a flow diagram of a method 500 for transmitting uplink control information (UCI) 228. The method 500 may be performed by a user equipment (UE) 104. The user equipment (UE) 104 may measure 502 downlink channels to obtain channel state information (CSI) 236. The user equipment (UE) 104 may receive 504 radio resource control (RRC) signaling 460 from an eNode B 102. The user equipment (UE) 104 may then determine 506 whether simultaneous physical uplink control channel (PUCCH) and physical uplink shared channel (PUSCH) transmission is enabled. Simultaneous physical uplink control channel (PUCCH) and physical uplink shared channel (PUSCH) transmission means that the physical uplink control channel (PUCCH) and physical uplink shared channel (PUSCH) are transmitted on the same subframe. It does not mean in Release-10 that the physical uplink control channel (PUCCH) and the physical uplink shared channel (PUSCH) occupy the same physical frequency resources. The systems and methods herein are independent of whether the physical uplink control channel (PUCCH) and the physical uplink shared channel (PUSCH) are transmitted on the same frequency resources.

The user equipment (UE) 104 may determine 506 whether simultaneous physical uplink control channel (PUCCH) and physical uplink shared channel (PUSCH) transmission is enabled using the simultaneousPUCCHandPUSCH parameter 465b. In one configuration, the simultaneousPUCCHandPUSCH parameter 465b may be signaled by an eNode B 402 via radio resource control (RRC) signaling 460. If the simultaneousPUCCHandPUSCH parameter 465b is set to true, simultaneous physical uplink control channel (PUCCH) and physical uplink shared channel (PUSCH) transmission is enabled. If the simultaneousPUCCHandPUSCH parameter 465b is set to false, simultaneous physical uplink control channel (PUCCH) and physical uplink shared channel (PUSCH) transmission is not enabled.

If simultaneous physical uplink control channel (PUCCH) and physical uplink shared channel (PUSCH) transmission is enabled, the user equipment (UE) 104 may transmit 508 the uplink control information (UCI) 228 on the physical uplink control channel (PUCCH). In one configuration, only a portion of the uplink control information (UCI) 228 is transmitted on the physical uplink control channel (PUCCH). In yet another configuration, none of the uplink control information (UCI) 228 is transmitted on the physical uplink control channel (PUCCH). Transmitting 508 the uplink control information (UCI) 228 on the physical uplink control channel (PUCCH) is discussed in further detail below in relation to FIG. 6. The user equipment (UE) 104 may transmit 508 the uplink control information (UCI) 228 on the physical uplink control channel (PUCCH) according to radio resource control (RRC) signaling 460 from an eNode B 102.

The user equipment (UE) 104 may then transmit 510 some or all of the aperiodic channel state information (CSI) reports 236c on the physical uplink shared channel (PUSCH). In one configuration, the user equipment (UE) 104 may transmit 510 the aperiodic channel state information (CSI) reports 236c on the physical uplink shared channel (PUSCH) according to radio resource control (RRC) signaling 460 from an eNode B 102. The user equipment (UE) 104 may also transmit 512 none, some or all of the remaining periodic channel state information (CSI) reports 236b on the physical uplink shared channel (PUSCH) using a selection procedure. As used herein, the remaining periodic channel state information (CSI) reports 236b refers to those periodic channel state information (CSI) reports 236b at the output of the selection procedure. The number of periodic channel state information (CSI) reports 236b transmitted on the physical uplink shared channel (PUSCH) may depend on radio resource control (RRC) signaling 460 from an eNode B 102. For example, the number of periodic channel state information (CSI) reports 236b transmitted on the physical uplink shared channel (PUSCH) may be dependent on the CSI-Report-List parameter 466, the No-CSI-on-PUSCH parameter 463 and the Number-of-CSI-Report parameter 464.

If simultaneous physical uplink control channel (PUCCH) and physical uplink shared channel (PUSCH) transmission is not enabled (and thus either only the physical uplink control channel (PUCCH) is scheduled for transmission (for which the transmission procedure on the physical uplink control channel (PUCCH) is performed (as discussed below in relation to FIG. 6) or only the physical uplink shared channel (PUSCH) is scheduled for transmission (which is discussed here)), the user equipment (UE) 104 may determine 514 whether single periodic channel state information (CSI) reporting or multiple periodic channel state information (CSI) reporting is enabled. If the physical uplink control channel (PUCCH) is not scheduled for transmission, then the HARQ-ACK 240 and all or some of the aperiodic channel state information (CSI) reports 236*c* may be transmitted on the physical uplink shared channel (PUSCH). If the user equipment (UE) 104 has one or multiple periodic channel state information (CSI) reports 236*b* to be reported, it may be unclear how many of the channel state information (CSI) reports 236 are to be transmitted on the physical uplink shared channel (PUSCH). This may be solved by radio resource control (RRC) signaling 460 of the Multiple-CSI-Report parameter 461*a* and the Multiple-CSI-Report-PUSCH parameter 462*a*.

The Multiple-CSI-Report parameter 461*a* and the Multiple-CSI-Report-PUSCH parameter 462*a* may be used to determine 514 whether single periodic channel state information (CSI) reporting or multiple periodic channel state information (CSI) reporting is enabled. This is discussed in additional detail below in relation to FIGS. 10-12. If single periodic channel state information (CSI) reporting is enabled, the user equipment (UE) 104 may transmit 516 a single channel state information (CSI) report 236*b* on the physical uplink shared channel (PUSCH). If multiple channel state information (CSI) reporting is enabled, the user equipment (UE) 104 may transmit 518 multiple channel state information (CSI) reports 236*b* on the physical uplink shared channel (PUSCH).

Figure 6:
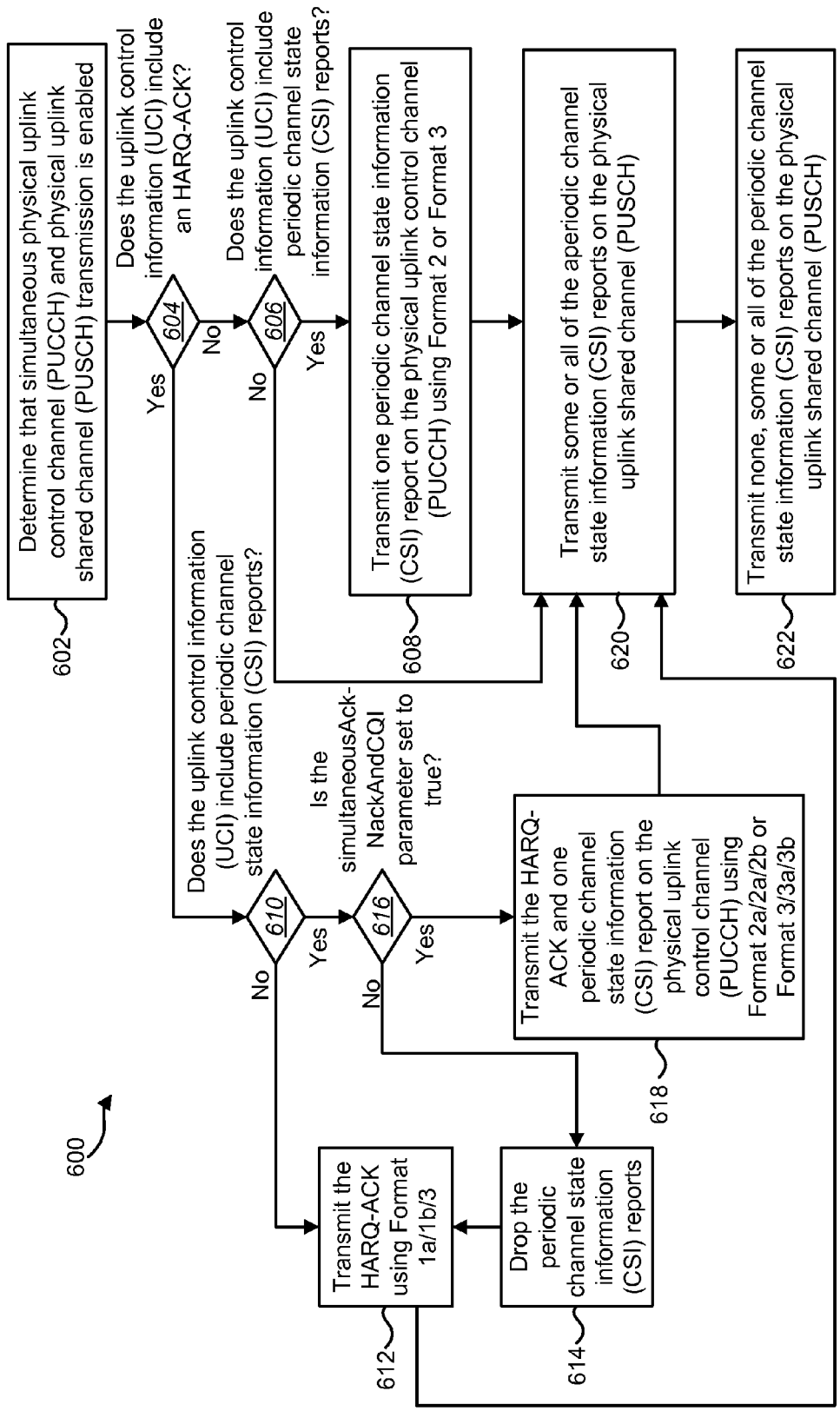
FIG. 6 is a flow diagram of a method for transmitting uplink control information (UCI) on the physical uplink control channel (PUCCH)

FIG. 6 is a flow diagram of a method 600 for transmitting uplink control information (UCI) 228 on the physical uplink control channel (PUCCH). The method 600 may be performed by a user equipment (UE) 104. The user equipment (UE) 104 may determine 602 that simultaneous physical uplink control channel (PUCCH) and physical uplink shared channel (PUSCH) is enabled. The user equipment (UE) 104 may also determine 604 whether the uplink control information (UCI) 228 includes an HARQ-ACK 240 to be transmitted.

If the uplink control information (UCI) 228 does not include an HARQ-ACK 240 to be transmitted, the user equipment (UE) 104 may determine 606 whether the uplink control information (UCI) 228 includes periodic channel state information (CSI) reports 236*a-b*. If the uplink control information (UCI) 228 does include periodic channel state information (CSI) reports 236*a-b*, the user equipment (UE) 104 may transmit 608 one periodic channel state information (CSI) report 236*a* on the physical uplink control channel (PUCCH) using Format 2 or Format 3. The user equipment (UE) 104 may also transmit 620 some or all of the aperiodic channel state information (CSI) reports 236*c* on the physical uplink shared channel (PUSCH). If the uplink control information (UCI) 228 does not include any periodic channel state information (CSI) reports 236*a-b*, the user equipment (UE) 104 may transmit 620 some or all of the aperiodic channel state information (CSI) reports 236*c* on the physical uplink shared channel (PUSCH).

If the uplink control information (UCI) 228 does include an HARQ-ACK 240 to be transmitted, the user equipment (UE) 104 may determine 610 whether the uplink control information (UCI) 228 includes periodic channel state information (CSI) reports 236*a-b*. If the uplink control information (UCI) 228 does include periodic channel state information (CSI) reports 236*a-b*, the user equipment (UE) 104 may determine 616 whether the simultaneousAckNackAndCQI parameter 116 is set to true. If the simultaneousAckNackAndCQI parameter 116 is not set to true, the user equipment (UE) 104 may drop 614 the periodic channel state information (CSI) reports 236*a-b*. These dropped periodic channel state information (CSI) reports 236*a-b* are not destroyed. Instead, they are placed into a set of periodic channel state information (CSI) reports 236*b* that may be reported on the physical uplink shared channel (PUSCH).

In general, for a given component carrier (cell), different channel state information (CSI) reports 236 may be generated. Examples of channel state information (CSI) reports 236 include narrow band, wide bad, sub band and UE-specific band. Therefore, at any given subframe, a multitude of channel state information (CSI) measures may exist for a given component carrier (cell). The selection process decides the set of channel state information (CSI) reports 236 that are eligible for transmission. From this set, at most one periodic channel state information (CSI) report 236*a* may be transmitted on the physical uplink control channel (PUCCH) and, depending on the configuration of parameters, from the remaining periodic channel state information (CSI) reports 236, one, some or all may be transmitted on the physical uplink shared channel (PUSCH).

The user equipment (UE) 104 may then transmit 612 the HARQ-ACK 240*a* on the physical uplink control channel (PUCCH). In one configuration, the user equipment (UE) 104 may transmit 612 the HARQ-ACK 240*a* on the physical uplink control channel (PUCCH) using Format 1a or Format 1b (with channel selection) or Format 3.

If the uplink control information (UCI) 228 does not include periodic channel state information (CSI) reports 236*a-b*, the user equipment (UE) 104 may transmit 612 the HARQ-ACK 240*a* on the physical uplink control channel (PUCCH). The user equipment (UE) 104 may also transmit 620 some or all of the aperiodic channel state information (CSI) reports 236*c* on the physical uplink shared channel (PUSCH).

If the simultaneousAckNackAndCQI parameter 116 is set to true, the user equipment (UE) 104 may transmit 618 the HARQ-ACK 240*a* and one periodic channel state information (CSI) report 236*a* on the physical uplink control channel (PUCCH) using Format 2/2a/2b or Format 3/3a/3b. The user equipment (UE) 104 may also transmit 620 some or all of the aperiodic channel state information (CSI) reports 236*c* on the physical uplink shared channel (PUSCH). The user equipment (UE) 104 may further transmit 622 none, some or all of the remaining periodic channel state information (CSI) reports 236*b* on the physical uplink shared channel (PUSCH).

In general, transmission on the physical uplink control channel (PUCCH) is more complicated than transmission on the physical uplink shared channel (PUSCH). This is because the scheduling request (SR) signal transmission and collision needs to be considered. However, when the physical uplink shared channel (PUSCH) is scheduled for transmission, the scheduling request (SR) signal is not transmitted and hence is omitted from the procedures for transmission on the physical uplink control channel (PUCCH).

In cases of simultaneous physical uplink control channel (PUCCH) and physical uplink shared channel (PUSCH) transmission, the HARQ-ACK 240*a* (if it exists) is always transmitted on the physical uplink control channel (PUCCH) and the aperiodic channel state information (CSI) report 236*c* (if it exists) is always transmitted on the physical uplink shared channel (PUSCH). However, if the uplink control information (UCI) 228 includes one or more periodic channel state information (CSI) reports 236*a-b*, it may not be clear how many of them can be transmitted on the physical uplink shared channel (PUSCH). The introduction of radio resource control (RRC) signaling 460 allows the user equipment (UE) 104 to transmit no periodic channel state information (CSI) reports 236*b*, a single periodic channel state information (CSI) report 236*b* or multiple periodic channel state information (CSI) reports 236b on the physical uplink shared channel (PUSCH) as signaled by the eNode B 102.

The above transmit steps may occur simultaneously for the same subframe. For example, the user equipment (UE) 104 may simultaneously transmit 612 the HARQ-ACK 240a and at most one periodic channel state information (CSI) report 236a on the physical uplink control channel (PUCCH), transmit 620 some or all of the aperiodic channel state information (CSI) reports 236c on the physical uplink shared channel (PUSCH) and transmit 622 none, some or all of the remaining periodic channel state information (CSI) reports 236b on the physical uplink shared channel (PUSCH).

FIG. 7 is a flow diagram of a method 700 for simultaneously transmitting uplink control information (UCI) 228 on the physical uplink control channel (PUCCH) and the physical uplink shared channel (PUSCH) using both the Multiple-CSI-Report parameter 461 and the Multiple-CSI-Report-PUSCH parameter 462. The method 700 may be performed by a user equipment (UE) 104. The user equipment (UE) 104 may transmit 702 the uplink control information (UCI) 228a on the physical uplink control channel (PUCCH). This may be referred to as the physical uplink control channel (PUCCH) transmission procedure. The physical uplink control channel (PUCCH) transmission procedure was discussed above in relation to FIG. 6.

The user equipment (UE) 104 may also transmit 704 some or all of the aperiodic channel state information (CSI) reports 236c on the physical uplink shared channel (PUSCH). The number of aperiodic channel state information (CSI) reports 236c on the physical uplink shared channel (PUSCH) may depend on the CSI-Report-List parameter 466 or the Number-of-CSI-Report parameter 464 signaled via the radio resource control (RRC) signaling 460 by the eNode B 102.

The user equipment (UE) 104 may determine 706 whether there are any remaining periodic channel state information (CSI) reports 236b for transmission. If there are no remaining periodic channel state information (CSI) reports 236b for transmission, the method ends. If there are remaining periodic channel state information (CSI) reports 236b for transmission, the user equipment (UE) 104 may determine 708 whether the Multiple-CSI-Report parameter 461 is set to on or off.

If the Multiple-CSI-Report parameter 461 is set to off, the user equipment (UE) 104 may determine 710 whether there is a periodic channel state information (CSI) report 236a on the physical uplink control channel (PUCCH). If there is a periodic channel state information (CSI) report 236a on the physical uplink control channel (PUCCH), the method ends (and no periodic channel state information (CSI) reports 236b are transmitted on the physical uplink shared channel (PUSCH)). If there is not a periodic channel state information (CSI) report 236a on the physical uplink control channel (PUCCH), the user equipment (UE) 104 may transmit 716 only one periodic channel state information (CSI) report 236b on the physical uplink shared channel (PUSCH).

If the Multiple-CSI-Report parameter 461 is set to on, the user equipment (UE) 104 may determine 714 whether the Multiple-CSI-Report-PUSCH parameter 462 is set to on or off. If the Multiple-CSI-Report-PUSCH parameter 462 is set to off, the user equipment (UE) 104 may transmit 716 only one periodic channel state information (CSI) report 236b on the physical uplink shared channel (PUSCH). If the Multiple-CSI-Report-PUSCH parameter 462 is set to on, the user equipment (UE) 104 may transmit 718 one or more periodic channel state information (CSI) reports 236b on the physical uplink shared channel (PUSCH). The number of periodic channel state information (CSI) reports 236b that can be transmitted may be defined by the CSI-Report-List parameter 466 or the Number-of-CSI-Report parameter 464. In one configuration, all of the remaining periodic channel state information (CSI) reports 236b may be transmitted 718 on the physical uplink shared channel (PUSCH).

FIG. 8 is a flow diagram of a method 800 for simultaneously transmitting uplink control information (UCI) 228 on the physical uplink control channel (PUCCH) and the physical uplink shared channel (PUSCH) using only the Multiple-CSI-Report parameter 461. The method 800 may be performed by a user equipment (UE) 104. The user equipment (UE) 104 may transmit 802 the uplink control information (UCI) 228a on the physical uplink control channel (PUCCH). This may be referred to as the physical uplink control channel (PUCCH) transmission procedure. The physical uplink control channel (PUCCH) transmission procedure was discussed above in relation to FIG. 6.

The user equipment (UE) 104 may also transmit 804 some or all of the aperiodic channel state information (CSI) reports 236c on the physical uplink shared channel (PUSCH). The number of aperiodic channel state information (CSI) reports 236c on the physical uplink shared channel (PUSCH) may depend on the CSI-Report-List parameter 466 or the Number-of-CSI-Report parameter 464 signaled via radio resource control (RRC) signaling 460 by the eNode B 102.

The user equipment (UE) 104 may determine 806 whether there are any remaining periodic channel state information (CSI) reports 236b for transmission. If there are no remaining periodic channel state information (CSI) reports 236b for transmission, the method ends. If there are remaining periodic channel state information (CSI) reports 236b for transmission, the user equipment (UE) 104 may determine 808 whether the Multiple-CSI-Report parameter 461 is set to on or off.

If the Multiple-CSI-Report parameter 461 is set to off, the user equipment (UE) 104 may determine 810 whether there is a periodic channel state information (CSI) report 236a on the physical uplink control channel (PUCCH). If there is a periodic channel state information (CSI) report 236a on the physical uplink control channel (PUCCH), the method ends (and no periodic channel state information (CSI) reports 236b are transmitted on the physical uplink shared channel (PUSCH)). If there is not a periodic channel state information (CSI) report 236a on the physical uplink control channel (PUCCH), the user equipment (UE) 104 may transmit 812 only one periodic channel state information (CSI) report 236b on the physical uplink shared channel (PUSCH).

If the Multiple-CSI-Report parameter 461 is set to on, the user equipment (UE) 104 may transmit 814 one or more periodic channel state information (CSI) reports 236b on the physical uplink shared channel (PUSCH). The number of periodic channel state information (CSI) reports 236b that can be transmitted may be defined by the CSI-Report-List parameter 466 or the Number-of-CSI-Report parameter 464. In one configuration, all of the remaining periodic channel state information (CSI) reports 236b may be transmitted 814 on the physical uplink shared channel (PUSCH).

FIG. 9 is a flow diagram of a method 900 for simultaneously transmitting uplink control information (UCI) 228 on the physical uplink control channel (PUCCH) and the physical uplink shared channel (PUSCH) using only the Multiple-CSI-Report-PUSCH parameter 462. The method 900 may be performed by a user equipment (UE) 104. The user equipment (UE) 104 may transmit 902 the uplink control information (UCI) 228a on the physical uplink control channel (PUCCH). This may be referred to as the physical uplink control channel (PUCCH) transmission procedure. The physical uplink control channel (PUCCH) transmission procedure was discussed above in relation to FIG. 6.

The user equipment (UE) 104 may also transmit 904 some or all of the aperiodic channel state information (CSI) reports 236c on the physical uplink shared channel (PUSCH). The number of aperiodic channel state information (CSI) reports 236c on the physical uplink shared channel (PUSCH) may depend on the CSI-Report-List parameter 466 or the Number-of-CSI-Report parameter 464 signaled via radio resource control (RRC) signaling 460 by the eNode B 102.

The user equipment (UE) 104 may determine 906 whether there are any remaining periodic channel state information (CSI) reports 236b for transmission. If there are no remaining periodic channel state information (CSI) reports 236b for transmission, the method ends. If there are remaining periodic channel state information (CSI) reports 236b for transmission, the user equipment (UE) 104 may determine 908 whether the Multiple-CSI-Report-PUSCH parameter 462 is set to on or off.

If the Multiple-CSI-Report-PUSCH parameter 462 is set to off, the user equipment (UE) 104 may transmit 910 only one periodic channel state information (CSI) report 236b on the physical uplink shared channel (PUSCH). If the Multiple-CSI-Report-PUSCH parameter 462 is set to on, the user equipment (UE) 104 may transmit 912 one or more periodic channel state information (CSI) reports 236b on the physical uplink shared channel (PUSCH) (as defined by the CSI-Report-List parameter 466 or the Number-of-CSI-Report parameter 464). In one configuration, all of the remaining periodic channel state information (CSI) reports 236b may be transmitted 912 on the physical uplink shared channel (PUSCH).

FIG. 10 is a flow diagram of a method 1000 for transmitting uplink control information (UCI) 228b on the physical uplink shared channel (PUSCH) using both the Multiple-CSI-Report parameter 461 and the Multiple-CSI-Report-PUSCH parameter 462. The method 1000 may be performed by a user equipment (UE) 104. The user equipment (UE) 104 may determine 1002 that simultaneous physical uplink control channel (PUCCH) and physical uplink shared channel (PUSCH) transmission is not enabled. For example, the user equipment (UE) 104 may determine 1002 that the simultaneousPUCCHandPUSCH parameter 465 is set to false.

The user equipment (UE) 104 may transmit 1004 the HARQ-ACK 240b and one or more aperiodic channel state information (CSI) reports 236c on the physical uplink shared channel (PUSCH). The number of aperiodic channel state information (CSI) reports 236c that can be transmitted may be defined by the CSI-Report-List parameter 466 or the Number-of-CSI-Report parameter 464.

The user equipment (UE) 104 may determine 1006 whether there are any remaining periodic channel state information (CSI) reports 236b for transmission. If there are no remaining periodic channel state information (CSI) reports 236b for transmission, the method ends. If there are remaining periodic channel state information (CSI) reports 236b for transmission, the user equipment (UE) 104 may determine 1008 whether the Multiple-CSI-Report parameter 461 is set to on or off.

If the Multiple-CSI-Report parameter 461 is set to off, the user equipment (UE) 104 may determine 1010 whether the Multiple-CSI-Report-PUSCH parameter 462 is set to on or off. If the Multiple-CSI-Report-PUSCH parameter 462 is set to on, the user equipment (UE) 104 may perform 1012 error handling (as this is not a valid state). If the Multiple-CSI-Report-PUSCH parameter 462 is set to off, the user equipment (UE) 104 may transmit 1014 only one periodic channel state information (CSI) report 236b on the physical uplink shared channel (PUSCH).

If the Multiple-CSI-Report parameter 461 is set to on, the user equipment (UE) 104 may determine 1016 whether the Multiple-CSI-Report-PUSCH parameter 462 is set to on or off. If the Multiple-CSI-Report-PUSCH parameter 462 is set to off, the user equipment (UE) may transmit 1014 one periodic channel state information (CSI) report 236b on the physical uplink shared channel (PUSCH). If the Multiple-CSI-Report-PUSCH parameter 462 is set to on, the user equipment (UE) 104 may transmit 1018 one or more periodic channel state information (CSI) reports 236b on the physical uplink shared channel (PUSCH). The number of periodic channel state information (CSI) reports 236b that are be transmitted may be defined by the CSI-Report-List parameter 466 or the Number-of-CSI-Report parameter 464 that are signaled via the radio resource control (RRC) signaling 460 by the eNode B 102. In one configuration, all of the remaining periodic channel state information (CSI) reports 236b may be transmitted 1018 on the physical uplink shared channel (PUSCH).

FIG. 11 is a flow diagram of a method 1100 for transmitting uplink control information (UCI) 228b on the physical uplink shared channel (PUSCH) using only the Multiple-CSI-Report parameter 461. The method 1100 may be performed by a user equipment (UE) 104. The user equipment (UE) 104 may determine 1102 that simultaneous physical uplink control channel (PUCCH) and physical uplink shared channel (PUSCH) transmission is not enabled. For example, the user equipment (UE) 104 may determine 1102 that the simultaneousPUCCHandPUSCH parameter 465 is set to false.

The user equipment (UE) 104 may transmit 1104 the HARQ-ACK 240b and one or more aperiodic channel state information (CSI) reports 236c on the physical uplink shared channel (PUSCH). The number of aperiodic channel state information (CSI) reports 236c that can be transmitted may be defined by the CSI-Report-List parameter 466 or the Number-of-CSI-Report parameter 464.

The user equipment (UE) 104 may determine 1106 whether there are any remaining periodic channel state information (CSI) reports 236b for transmission. If there are no remaining periodic channel state information (CSI) reports 236b for transmission, the method ends. If there are remaining periodic channel state information (CSI) reports 236b for transmission, the user equipment (UE) 104 may determine 1108 whether the Multiple-CSI-Report parameter 461 is set to on or off.

If the Multiple-CSI-Report parameter 461 is set to off, the user equipment (UE) 104 may transmit 1110 only one periodic channel state information (CSI) report 236b on the physical uplink shared channel (PUSCH). If the Multiple-CSI-Report parameter 461 is set to on, the user equipment (UE) 104 may transmit 1112 one or more periodic channel state information (CSI) reports 236b on the physical uplink shared channel (PUSCH). The number of periodic channel state information (CSI) reports 236b that can be transmitted may be defined by the CSI-Report-List parameter 466 or the Number-of-CSI-Report parameter 464 that are signaled via the radio resource control (RRC) signaling 460 by the eNode B 102. In one configuration, all of the remaining periodic channel state information (CSI) reports 236b may be transmitted 1112 on the physical uplink shared channel (PUSCH).

FIG. 12 is a flow diagram of a method 1200 for transmitting uplink control information (UCI) 228b on the physical uplink shared channel (PUSCH) using only the Multiple-CSI-Report-PUSCH parameter 462. The method 1200 may be performed by a user equipment (UE) 104. The user equipment (UE) 104 may determine 1202 that simultaneous physical uplink control channel (PUCCH) and physical uplink shared channel (PUSCH) transmission is not enabled. For example, the user equipment (UE) 104 may determine 1202 that the simultaneousPUCCHandPUSCH parameter 465 is set to false.

The user equipment (UE) 104 may transmit 1204 the HARQ-ACK 240*b* and one or more aperiodic channel state information (CSI) reports 236*c* on the physical uplink shared channel (PUSCH). The number of aperiodic channel state information (CSI) reports 236*c* that can be transmitted may be defined by the CSI-Report-List parameter 466 or the Number-of-CSI-Report parameter 464.

The user equipment (UE) 104 may determine 1206 whether there are any remaining periodic channel state information (CSI) reports 236*b* for transmission. If there are no remaining periodic channel state information (CSI) reports 236*b* for transmission, the method ends. If there are remaining periodic channel state information (CSI) reports 236*b* for transmission, the user equipment (UE) 104 may determine 1208 whether the Multiple-CSI-Report-PUSCH parameter 462 is set to on or off.

If the Multiple-CSI-Report-PUSCH parameter 462 is set to off, the user equipment (UE) 104 may transmit 1210 only one periodic channel state information (CSI) report 236*b* on the physical uplink shared channel (PUSCH). If the Multiple-CSI-Report-PUSCH parameter 462 is set to on, the user equipment (UE) 104 may transmit 1212 one or more periodic channel state information (CSI) reports 236*b* on the physical uplink shared channel (PUSCH). The number of periodic channel state information (CSI) reports 236*b* that can be transmitted may be defined by the CSI-Report-List parameter 466 or the Number-of-CSI-Report parameter 464 that are signaled via the radio resource control (RRC) signaling 460 by the eNode B 102. In one configuration, all of the remaining periodic channel state information (CSI) reports 236*b* may be transmitted 1212 on the physical uplink shared channel (PUSCH).

Figure 13:
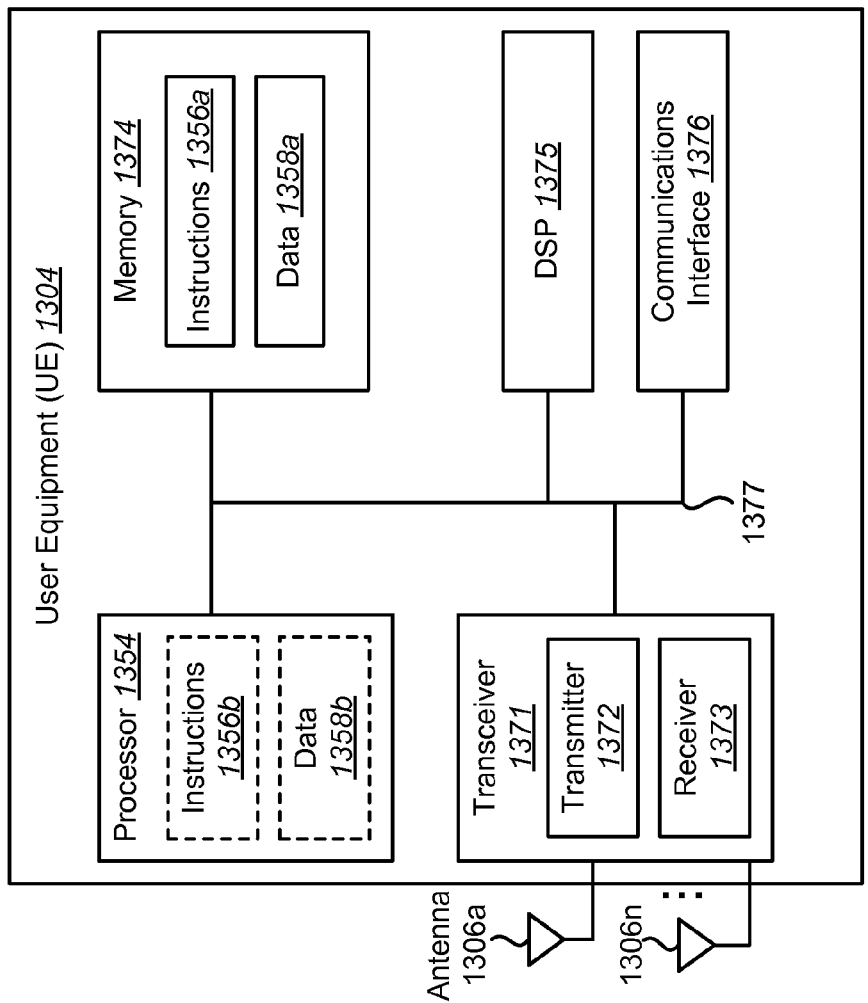
FIG. 13 illustrates various components that may be utilized in a user equipment (UE)

FIG. 13 illustrates various components that may be utilized in a user equipment (UE) 1304. The user equipment (UE) 1304 may be utilized as the user equipment (UE) 104 illustrated previously. The user equipment (UE) 1304 includes a processor 1354 that controls operation of the UE 1304. The processor 1354 may also be referred to as a CPU. Memory 1374, which may include both read-only memory (ROM), random access memory (RAM) or any type of device that may store information, provides instructions 1356*a* and data 1358*a* to the processor 1354. A portion of the memory 1374 may also include non-volatile random access memory (NVRAM). Instructions 1356*b* and data 1358*b* may also reside in the processor 1354. Instructions 1356*b* and/or data 1358*b* loaded into the processor 1354 may also include instructions 1356*a* and/or data 1358*a* from memory 1374 that were loaded for execution or processing by the processor 1354. The instructions 1356*b* may be executed by the processor 1354 to implement the systems and methods disclosed herein.

The user equipment (UE) 1304 may also include a housing that contains a transmitter 1372 and a receiver 1373 to allow transmission and reception of data. The transmitter 1372 and receiver 1373 may be combined into a transceiver 1371. One or more antennas 1306*a-n* are attached to the housing and electrically coupled to the transceiver 1371.

The various components of the user equipment (UE) 1304 are coupled together by a bus system 1377 which may include a power bus, a control signal bus, and a status signal bus, in addition to a data bus. However, for the sake of clarity, the various buses are illustrated in FIG. 13 as the bus system 1377. The user equipment (UE) 1304 may also include a digital signal processor (DSP) 1375 for use in processing signals. The user equipment (UE) 1304 may also include a communications interface 1376 that provides user access to the functions of the user equipment (UE) 1304. The user equipment (UE) 1304 illustrated in FIG. 13 is a functional block diagram rather than a listing of specific components.

Figure 14:
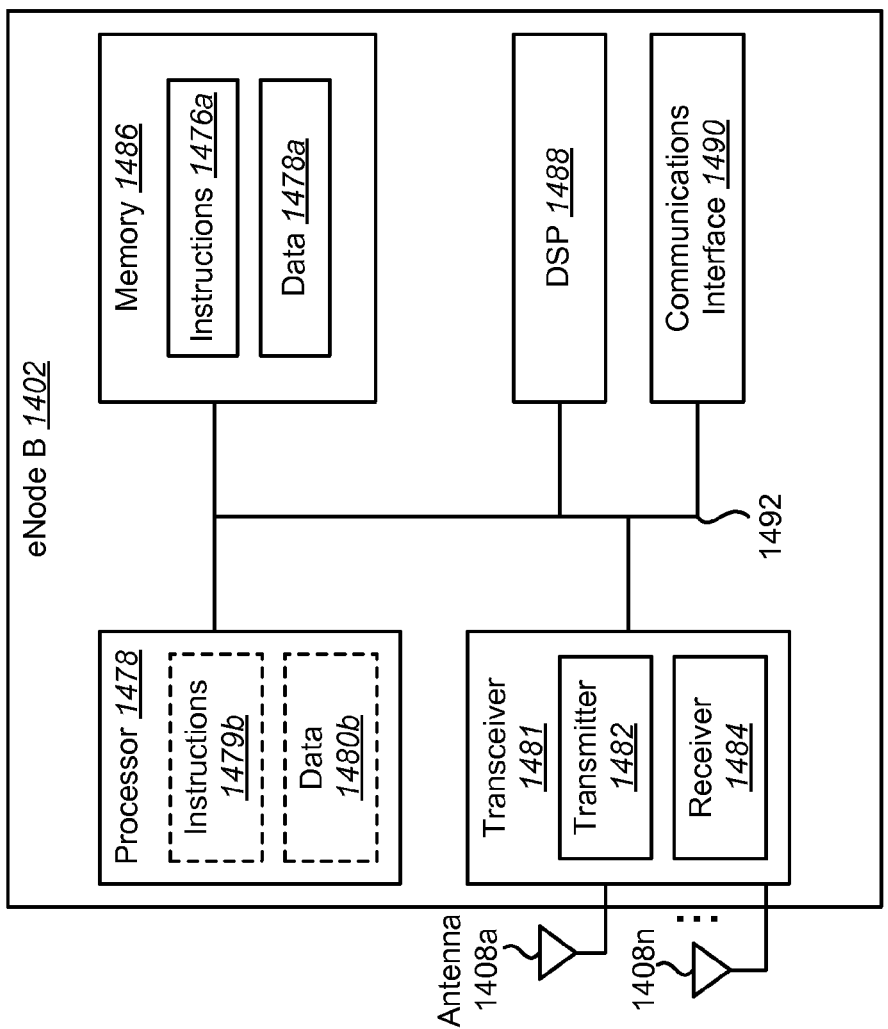
FIG. 14 illustrates various components that may be utilized in an eNode B.

FIG. 14 illustrates various components that may be utilized in an eNode B 1402. The eNode B 1402 may be utilized as the eNode B 102 illustrated previously. The eNode B 1402 may include components that are similar to the components discussed above in relation to the user equipment (UE) 1304, including a processor 1478, memory 1486 that provides instructions 1479*a* and data 1480*a* to the processor 1478, instructions 1479*b* and data 1480*b* that may reside in or be loaded into the processor 1478, a housing that contains a transmitter 1482 and a receiver 1484 (which may be combined into a transceiver 1481), one or more antennas 1408*a-n* electrically coupled to the transceiver 1481, a bus system 1492, a DSP 1488 for use in processing signals, a communications interface 1490 and so forth.

Unless otherwise noted, the use of '/' above represents the phrase "and/or".

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio, and microwave, then the coaxial cable, fiber optic cable, twisted pair, DSL, or wireless technologies such as infrared, radio and microwave are included in the definition of transmission medium.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for reporting uplink control information (UCI) by a user equipment (UE), comprising:
    measuring downlink channels to obtain one or more channel state information (CSI) reports;
    receiving a first parameter via radio resource control (RRC) signaling from an eNode B;
    determining whether only one periodic CSI report or more than one periodic CSI report is transmitted in a subframe in which the UCI comprises at least one periodic CSI report based on the first parameter; and
    transmitting the UCI.

2. The method of claim 1, wherein determining whether only one periodic CSI report or more than one periodic CSI report is transmitted comprises determining whether no periodic CSI report, only one periodic CSI report or more than one periodic CSI report is transmitted on a physical uplink shared channel (PUSCH) in the subframe.

3. The method of claim 2, wherein determining whether only one periodic CSI report or more than one periodic CSI report is transmitted in the subframe comprises determining whether a periodic CSI report is transmitted on a physical uplink control channel (PUCCH) or no periodic CSI report is transmitted on the PUCCH.

4. The method of claim 3, wherein determining whether a periodic CSI report is transmitted on the PUCCH or no periodic CSI report is transmitted on the PUCCH is based on a second parameter that was received via RRC signaling from the eNode B.

5. The method of claim 4, wherein determining whether a periodic CSI report is transmitted on the PUCCH or no periodic CSI report is transmitted on the PUCCH is further based on whether the UCI comprises a hybrid automatic repeat request acknowledgement (HARQ-ACK).

6. The method of claim 1, wherein the first parameter indicates a number of periodic CSI reports transmitted.

7. The method of claim 1, wherein transmitting the UCI comprises transmitting the UCI on a physical uplink control channel (PUCCH), on a physical uplink shared channel (PUSCH), or on both the PUCCH and the PUSCH.

8. The method of claim 1, wherein the first parameter enables transmitting multiple CSI reports.

9. The method of claim 2, wherein the first parameter enables transmitting multiple CSI reports on the PUSCH.

10. The method of claim 3, wherein when the UE is required to transmit on the PUSCH and the PUCCH simultaneously in the subframe, no periodic CSI report is transmitted on the PUCCH in the subframe.

11. The method of claim 3, wherein when the UE is required to transmit on the PUSCH and the PUCCH simultaneously in the subframe, the periodic CSI report is transmitted on the PUCCH in the subframe.

12. A user equipment (UE) configured for reporting uplink control information (UCI), comprising:
    a receiving unit configured to:
        measure downlink channels to obtain one or more channel state information (CSI) reports; and
        receive a first parameter via radio resource control (RRC) signaling from an eNode B
    an operations unit configured to determine whether only one periodic CSI report or more than one periodic CSI report is transmitted in a subframe in which the UCI comprises at least one periodic CSI report based on the first parameter; and
    a transmitting unit configured to transmit the UCI.

13. The UE of claim 12, wherein determining whether only one periodic CSI report or more than one periodic CSI report is transmitted comprises determining whether no periodic CSI report, only one periodic CSI report or more than one periodic CSI report is transmitted on a physical uplink shared channel (PUSCH) in the subframe.

14. The UE of claim 12, wherein determining whether only one periodic CSI report or more than one periodic CSI report is transmitted in the subframe comprises determining whether a periodic CSI report is transmitted on a physical uplink control channel (PUCCH) or no periodic CSI report is transmitted on the PUCCH.

15. The UE of claim 14, wherein determining whether a periodic CSI report is transmitted on the PUCCH or no periodic CSI report is transmitted on the PUCCH is based on a second parameter that was received via RRC signaling from the eNode B.

16. The UE of claim 15, wherein determining whether a periodic CSI report is transmitted on the PUCCH or no periodic CSI report is transmitted on the PUCCH is further based on whether the UCI comprises a hybrid automatic repeat request acknowledgement (HARQ-ACK).

17. The UE of claim 12, wherein the first parameter indicates a number of periodic CSI reports transmitted.

18. The UE of claim 12, wherein transmitting the UCI comprises transmitting the UCI on a physical uplink control channel (PUCCH), on a physical uplink shared channel (PUSCH), or on both the PUCCH and the PUSCH.

19. The UE of claim 12, wherein the first parameter enables transmitting multiple CSI reports.

20. The UE of claim 13, wherein the first parameter enables transmitting multiple CSI reports on the PUSCH.

21. The UE of claim 14, wherein when the UE is required to transmit on the PUSCH and the PUCCH simultaneously in the subframe, no periodic CSI report is transmitted on the PUCCH in the subframe.

22. The UE of claim 14, wherein when the UE is required to transmit on the PUSCH and the PUCCH simultaneously in the subframe, the periodic CSI report is transmitted on the PUCCH in the subframe.

23. A method for controlling uplink control information (UCI) reporting of a user equipment (UE) by an eNode B, comprising:
sending a first parameter to the UE via radio resource control (RRC) signaling;
determining whether only one periodic CSI report or more than one periodic CSI report is transmitted by the UE in a subframe in which the UCI comprises at least one periodic CSI report based on the first parameter; and
receiving the UCI.

24. The method of claim 23, wherein determining whether only one periodic CSI report or more than one periodic CSI report is transmitted by the UE in a subframe comprises determining whether no periodic CSI report, only one periodic CSI report, or more than one periodic CSI report is transmitted by the UE on a physical uplink shared channel (PUSCH) in the subframe.

25. The method of claim 24, wherein determining whether only one periodic CSI report or more than one periodic CSI report is transmitted in the subframe comprises determining whether a periodic CSI report is transmitted on a physical uplink control channel (PUCCH) by the UE or no periodic CSI report is transmitted on the PUCCH by the UE.

26. The method of claim 25, wherein determining whether a periodic CSI report is transmitted on the PUCCH or no periodic CSI report is transmitted on the PUCCH is based on a second parameter that was sent via RRC signaling to the UE.

27. The method of claim 26, wherein determining whether a periodic CSI report is transmitted on the PUCCH or no periodic CSI report is transmitted by the UE on the PUCCH is further based on whether the UCI comprises a hybrid automatic repeat request acknowledgement (HARQ-ACK).

28. The method of claim 23, wherein the first parameter indicates a number of periodic CSI reports.

29. An eNode B configured for controlling uplink control information (UCI) reporting of a user equipment (UE), comprising:
a transmitting unit configured to send a first parameter to the UE via radio resource control (RRC) signaling;
an operations unit configured to determine whether only one periodic CSI report or more than one periodic CSI report is transmitted by the UE in a subframe in which the UCI comprises at least one periodic CSI report based on the first parameter; and
a receiving unit configured to receive the UCI.

30. The eNode B of claim 29, wherein determining whether only one periodic CSI report or more than one periodic CSI report is transmitted by the UE in a subframe comprises determining whether no periodic CSI report, only one periodic CSI report, or more than one periodic CSI report is transmitted by the UE on a physical uplink shared channel (PUSCH) in the subframe.

31. The eNode B of claim 30, wherein determining whether only one periodic CSI report or more than one periodic CSI report is transmitted in the subframe comprises determining whether a periodic CSI report is transmitted on a physical uplink control channel (PUCCH) by the UE or no periodic CSI report is transmitted on the PUCCH by the UE.

32. The eNode B of claim 31, wherein determining whether a periodic CSI report is transmitted on the PUCCH or no periodic CSI report is transmitted on the PUCCH is based on a second parameter that was sent via RRC signaling to the UE.

33. The eNode B of claim 32, wherein determining whether a periodic CSI report is transmitted on the PUCCH or no periodic CSI report is transmitted by the UE on the PUCCH is further based on whether the UCI comprises a hybrid automatic repeat request acknowledgement (HARQ-ACK).

34. The eNode B of claim 29, wherein the first parameter indicates a number of periodic CSI reports.

35. The method of claim 23, wherein transmitting the UCI comprises transmitting the UCI on a physical uplink control channel (PUCCH), on a physical uplink shared channel (PUSCH), or on both the PUCCH and the PUSCH.

36. The method of claim 23, wherein the first parameter enables transmitting multiple CSI reports.

37. The method of claim 24, wherein the first parameter enables transmitting multiple CSI reports on the PUSCH.

38. The method of claim 25, wherein when the UE is required to transmit on the physical uplink shared channel (PUSCH) and the physical uplink control channel (PUCCH) simultaneously in the subframe, no periodic CSI report is transmitted by the UE on the PUCCH in the subframe.

39. The method of claim 25, wherein when the UE is required to transmit on the physical uplink shared channel (PUSCH) and the physical uplink control channel (PUCCH) simultaneously in the subframe, the periodic CSI report is transmitted by the UE on the PUCCH in the subframe.

40. The eNode B of claim 29, wherein transmitting the UCI comprises transmitting the UCI on a physical uplink control channel (PUCCH), on a physical uplink shared channel (PUSCH), or on the PUCCH and the PUSCH.

41. The eNode B of claim 29, wherein the first parameter enables transmitting multiple CSI reports.

42. The eNode B of claim 30, wherein the first parameter enables transmitting multiple CSI reports on the PUSCH.

43. The eNode B of claim 31, wherein when the UE is required to transmit on the physical uplink shared channel (PUSCH) and the physical uplink control channel (PUCCH) simultaneously in the subframe, no periodic CSI report is transmitted by the UE on the PUCCH in the subframe.

44. The eNode B of claim 31, wherein when the UE is required to transmit on the physical uplink shared channel (PUSCH) and the physical uplink control channel (PUCCH) simultaneously in the subframe, the periodic CSI report is transmitted by the UE on the PUCCH in the subframe.

* * * * *

UNITED STATES PATENT AND TRADEMARK OFFICE
CERTIFICATE OF CORRECTION

PATENT NO.         : 8,675,528 B2
APPLICATION NO.    : 12/946716
DATED              : March 18, 2014
INVENTOR(S)        : Ahmad Khoshnevis et al.

Page 1 of 1

It is certified that error appears in the above-identified patent and that said Letters Patent is hereby corrected as shown below:

In the Specification

In column 19, line 6 please delete "than log 2" and replace it with --than log2--.
In column 19, line 7 please delete "where log 2" and replace it with --where log2--.
In column 19, line 28 please delete "log 2(5)" and replace it with --log2(5)--.

Signed and Sealed this
Second Day of September, 2014

Michelle K. Lee
*Deputy Director of the United States Patent and Trademark Office*